United States Patent
De Vos et al.

(10) Patent No.: US 12,494,670 B2
(45) Date of Patent: Dec. 9, 2025

(54) METHOD AND DEVICE FOR ENERGY HARVESTING USING A POWER MANAGEMENT INTEGRATED CIRCUIT WITH A COLD-START VOLTAGE CONVERTER AND A MAIN VOLTAGE CONVERTER SYSTEM

(71) Applicant: E-PEAS S.A., Mont-Saint-Guibert (BE)

(72) Inventors: Julien De Vos, Mont-Saint-Guibert (BE); Geoffroy Gosset, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 758 days.

(21) Appl. No.: 17/783,724

(22) PCT Filed: Nov. 27, 2020

(86) PCT No.: PCT/EP2020/083592
§ 371 (c)(1),
(2) Date: Jun. 9, 2022

(87) PCT Pub. No.: WO2021/115799
PCT Pub. Date: Jun. 17, 2021

(65) Prior Publication Data
US 2023/0024118 A1    Jan. 26, 2023

(30) Foreign Application Priority Data
Dec. 10, 2019 (EP) ................................ 19214875

(51) Int. Cl.
*H02J 50/00* (2016.01)
*H02J 7/00* (2006.01)
(Continued)

(52) U.S. Cl.
CPC .......... *H02J 50/001* (2020.01); *H02J 7/0048* (2020.01); *H02J 7/345* (2013.01); *H02M 3/1582* (2013.01);
(Continued)

(58) Field of Classification Search
CPC ..................................................... H02J 50/001
(Continued)

(56) References Cited

U.S. PATENT DOCUMENTS

| | | | |
|---|---|---|---|
| 2015/0280554 A1* | 10/2015 | Yang ....................... | H02J 7/345 307/19 |
| 2016/0033982 A1* | 2/2016 | Moon .................... | H02M 3/156 323/281 |
| 2018/0309311 A1* | 10/2018 | Schaef .................. | H02J 7/0068 |

FOREIGN PATENT DOCUMENTS

| | | | |
|---|---|---|---|
| WO | WO2019/179752 | * | 2/2019 |
| WO | 2019179725 A1 | | 9/2019 |

OTHER PUBLICATIONS

Int'l. Search Report for PCT/EP2020/083592, dated May 3, 2021.

* cited by examiner

*Primary Examiner* — Yalkew Fantu
(74) *Attorney, Agent, or Firm* — MaxGoLaw PLLC

(57) ABSTRACT

A method for energy harvesting is provided that uses an auxiliary energy storage device as a voltage source for the controller of a main voltage converter system. The auxiliary energy storage device is initially charged with a cold-start voltage converter and thereafter a main voltage converter system is charging a first rechargeable energy storage device until an upper charging threshold level is reached. The voltage of the auxiliary energy storage device is monitored and kept equal to a target value suitable for operating the controller, or alternatively within a predefined voltage range corresponding to the supply voltage range for the controller.
(Continued)

Figure 1:
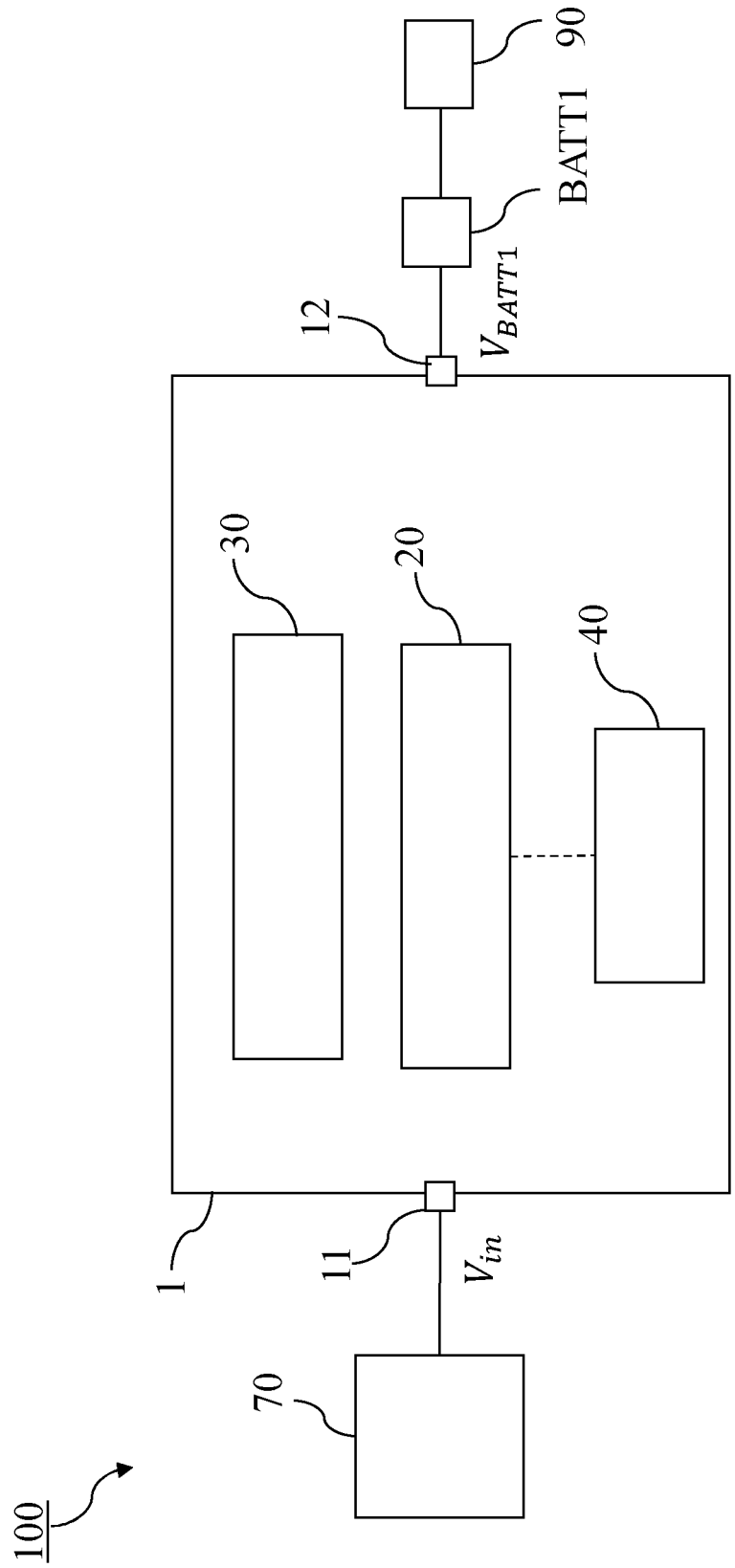

A power management integrated circuit for energy harvesting is provided that includes a cold-start and a main voltage converter system, an internal voltage node is kept at a target value or within a voltage range suitable as a supply voltage for the controller.

18 Claims, 17 Drawing Sheets

(51) Int. Cl.
  *H02J 7/34* (2006.01)
  *H02M 3/158* (2006.01)
(52) U.S. Cl.
  CPC ....... *H02J 2207/20* (2020.01); *H02J 2207/50* (2020.01)
(58) Field of Classification Search
  USPC .......................................................... 320/166
  See application file for complete search history.

METHOD AND DEVICE FOR ENERGY HARVESTING USING A POWER MANAGEMENT INTEGRATED CIRCUIT WITH A COLD-START VOLTAGE CONVERTER AND A MAIN VOLTAGE CONVERTER SYSTEM

FIELD OF THE INVENTION

The invention relates to a method and device for energy harvesting. More specifically it relates to a method and device for starting charging a rechargeable storage device using a power management integrated circuit (PMIC) comprising a cold-start voltage converter and a main voltage converter system.

DESCRIPTION OF PRIOR ART

The use of voltage converters for extracting energy from an energy harvester and charging a rechargeable energy storage device are well known in the art. The energy stored in the rechargeable storage device can then for example be used as a power source for an application load. The application load to be powered with the energy harvested can be any type of application such as for example portable devices, sensors, external circuits, wireless transmitters.

A variety of energy harvesters can be used as energy sources such as for example photovoltaic cells (PV), thermoelectric generators (TEG), piezoelectric energy generators and electromagnetic energy sources. The rechargeable storage device is for example a rechargeable battery such as Li-ion battery, a supercapacitor or a conventional capacitor.

Typically, an integrated circuit for energy harvesting comprises a main voltage converter system comprising one or more voltage converters such as a boost, a buck or a buck-boost DC-DC voltage converter. The operation of the main voltage converter system is controlled by a controller. The controller requires a supply voltage, for example a supply voltage of 2.5 V, 3.3 V or 5 V.

The PMIC for energy harvesting has however no internal power source to power the controller. With prior art PMIC's, the controller is receiving power from the rechargeable energy storage device that is connected to an output terminal of the PMIC. In some known embodiments, the PMIC comprises for example a buck converter for transforming the voltage of the rechargeable energy storage device into a required supply voltage for the controller. In other embodiments, the controller is connected to the same voltage as the storage device through switches.

As the rechargeable energy storage device is initially not charged, the PMIC comprises, in addition to the main voltage converter system, a cold-start voltage converter to start acquiring energy from the energy harvester without the use of the main voltage converter system. The cold-start voltage converter, for instance comprising a charge pump, has however a low efficiency when compared to the efficiency of the main voltage converter system that is regulated by the controller. Generally, the cold-start voltage converter is used until the rechargeable energy storage device is sufficiently charged to provide the required supply voltage to start operating the main voltage converter system. These cold-start voltage converters are self-starting voltage converters configured to start operating when an input voltage at the input of the cold-start voltage converter is above a minimum threshold value. The PMIC known under reference AEM10940 and provided by e-peas S.A. Belgium, comprises for example a cold-start voltage converter that starts to operate at an input voltage Vin as low as 380 mV and with an input power of at least 11 microwatt.

One of the problems with energy harvesting systems is that when initially starting with a depleted rechargeable storage device, it takes a long time to charge the rechargeable storage device with the cold-start voltage converter. As a consequence, it also takes a long time before the application load can receive power from the rechargeable storage device and start operating.

Especially if the rechargeable storage device is a supercapacitor, being at zero Volt when fully de-charged, the charging time of the supercapacitor can be very long. But also charging rechargeable batteries to a required charging level for being ready for supplying power to an application load during a sufficiently long time period can take a considerable long charging time.

A further problem with PMIC's is that when after charging the rechargeable energy storage device, the application load can only receive power from the rechargeable energy storage device as long as its voltage remains above a threshold voltage corresponding to the required supply voltage for the controller. For example, the rechargeable storage device can initially be charged up to 4.5 V, but when this voltage thereafter decrease below the supply voltage of for example 2.5 V, the PMIC stops operating. This happens even if the external load only requires a supply voltage of for example 1.2 V. When using a capacitor or a supercapacitor as a storage device, all the energy stored in the storage device cannot be used to supply to the load and oversizing of the storage device is required in order to achieve the target energy autonomy of the application, the target energy autonomy being the period of time without occurrence of energy harvesting.

Hence, there is room for improving integrated circuits for energy harvesting.

SUMMARY OF THE INVENTION

It is an object of the present invention to provide a method and device for energy harvesting and starting charging a rechargeable energy storage device in an efficient way such that for example an application load coupled with the rechargeable energy storage device can start operating more quickly, even in situations where the rechargeable storage device is initially fully depleted.

The present invention is defined in the appended independent claims. The dependent claims define advantageous embodiments.

According to a first aspect of the invention, a method is provided for energy harvesting using a power management integrated circuit PMIC comprising a cold-start voltage converter, a main voltage converter system and a controller for controlling the main voltage converter system. The controller is operable if a supply voltage $V_{sup}$ at a supply input of the controller is equal or above a minimum required supply voltage $V_{CS}$. The main voltage converter system is to be construed as a system comprising at least one main voltage converter such as for example a buck/boost voltage converter.

The method according to the first aspect of the invention comprises steps of:
coupling the energy harvester to an input of the main voltage converter system,
coupling a first rechargeable energy storage device to an output of the main voltage converter system,
coupling the energy harvester or another energy source to an input of the cold-start voltage converter, coupling an auxiliary rechargeable energy storage device, preferably a capacitor, to an output of the cold-start voltage converter, coupling the auxiliary rechargeable energy storage device to a supply input of the controller for using the auxiliary rechargeable energy storage device, when charged, as a dedicated voltage source for the controller, monitoring an auxiliary voltage $V_C$ of the auxiliary rechargeable energy storage device and monitoring a first storage parameter $V_{Batt1}$ indicative of a charging level of the first rechargeable energy storage device, charging the auxiliary rechargeable energy storage device by operating the cold-start voltage converter until the auxiliary voltage $V_C$ has reached a predefined switching voltage $V_{SW}$ with $V_{SW} \geq V_{CS}$, enabling operation of the main voltage converter system and disabling operation of the cold-start voltage converter if the auxiliary voltage $V_C$ has reached the predefined switching voltage $V_{SW}$, operating the main voltage converter system for charging the first rechargeable energy storage device with energy from the energy harvester as long as the first storage parameter $V_{Batt1}$ of the first rechargeable energy storage device is below a predefined upper storage value $V_{Batt1-up}$, and during said charging of the first rechargeable energy storage device (BATT1), maintaining said auxiliary rechargeable energy storage energy device (C1) electrically separated from the first rechargeable energy storage device (BATT1), maintaining the auxiliary voltage $V_C$ of the auxiliary rechargeable energy storage device:
a) equal to a target value, or alternatively,
b) within a voltage range between a lower threshold voltage ($V_{sup-min}$) and an upper threshold voltage ($V_{sup-max}$) higher than said lower threshold voltage ($V_{sup-min}$), and wherein said target value and said lower threshold voltage ($V_{sup-min}$) are equal or lower than said predefined switching voltage ($V_{SW}$) and higher than said minimum required supply voltage ($V_{CS}$) and wherein said maintaining of the auxiliary voltage equal to the target value or within a voltage range comprises operating the main voltage converter system, or alternatively operating the cold-start voltage converter, for recharging the auxiliary energy storage device (C1) with energy from the energy harvester (70).

In embodiments, the step of maintaining the auxiliary voltage $V_C$ of the auxiliary rechargeable energy storage device C1 equal to the target value comprises: continuously compensating a decrease of charges of the auxiliary energy storage device with energy from the energy harvester such that the auxiliary voltage $V_C$ remains equal to the target value.

In embodiments, the target value is higher than the minimum required supply voltage $V_{CS}$ and equal or lower than the predefined switching voltage $V_{SW}$.

In further embodiments, the step of maintaining the auxiliary voltage $V_C$ of the auxiliary rechargeable energy storage device C1 within a voltage range defined between a lower threshold voltage $V_{sup-min}$ and an upper threshold voltage comprises: if the auxiliary voltage $V_C$ has dropped below the lower threshold voltage $V_{sup-min}$ then recharging the auxiliary rechargeable energy storage device with energy from the energy harvester until the auxiliary voltage $V_C$ has reached the upper threshold voltage $V_{sup-max}$ higher than the lower threshold voltage $V_{sup-min}$. In embodiments, the lower threshold voltage $V_{sup-min}$ is higher than the minimum required supply voltage $V_{CS}$ and equal or lower than the predefined switching voltage $V_{SW}$.

Advantageously, by using an auxiliary energy storage device as a dedicated voltage source for the controller and maintaining the auxiliary rechargeable energy storage energy device electrically separated from the first rechargeable energy storage device, the voltage of the first rechargeable energy storage device that is being charged by the main voltage converter system remains independent from the supply voltage for the controller. Hence, even if for example, after having been charged, the voltage of the first rechargeable storage device decreases and drops below the minimum required supply voltage $V_{CS}$, the main voltage converter system can continue to operate thanks to the dedicated auxiliary energy storage device.

Advantageously, by using an auxiliary energy storage device as a dedicated supply voltage for the controller, the charging capacity of the auxiliary energy storage device can be taken much smaller than the charging capacity of the first rechargeable energy storage device charged by the main voltage converter system. In this way, the time needed to charge the auxiliary energy storage device with a cold-start voltage converter and reaching the required supply voltage for operating the controller is strongly reduced.

Advantageously, the first rechargeable energy storage device, i.e. the main storage device, is initially charged by the main converter system and not by the cold-start voltage converter. This fastens the first start-up thanks to the higher energy efficiency of the main voltage converter system.

In embodiments, the auxiliary rechargeable energy storage device is part of the PMIC, e.g. an integrated on-chip capacitor. In other embodiments, the auxiliary rechargeable energy storage device is a device external to the PMIC, e.g. an external capacitor or another rechargeable energy storage device.

Generally, the switching threshold $V_{SW}$ is defined such that $V_{CS} < V_{SW} \leq V_{sup-max}$ and more preferably, $V_{sup-min} \leq V_{SW} \leq V_{sup-max}$.

In embodiments, the upper storage value $V_{Batt1-up}$ when reached corresponds to the first rechargeable energy storage device being charged.

In embodiments, when the upper storage value $V_{Batt1-up}$ is reached the rechargeable energy storage device can be used to provide power to an application load. In other embodiments, the upper storage value $V_{Batt1-up}$ corresponds to the first rechargeable energy storage device being charged up to a percentage value of a fully charged status of the first rechargeable energy storage device, and wherein the percentage value is value in a range from 70% to 100%.

According to a second aspect of the invention a power management integrated circuit (PMIC) for energy harvesting is provided. The PMIC for energy harvesting comprises one or more power input terminals for receiving input power from an energy harvester or another power source, a first power output terminal connectable with a first rechargeable energy storage device, an auxiliary terminal connectable with an auxiliary rechargeable energy storage device or an integrated on-chip capacitor, a main voltage converter system for receiving input power through a first power input terminal of the one or more power input terminals, a controller configured for controlling the main voltage converter system, and wherein the controller is operable if a supply voltage $V_{sup}$ at a supply input of the controller is equal or above a minimum required supply voltage $V_{CS}$, and a cold-start voltage converter.

The cold-start voltage converter is configured for i) transferring input power to said auxiliary terminal or to the integrated on-chip capacitor, ii) receiving the input power through the first power input terminal or through a second power input terminal of the one or more power input terminals, and iii) starting operation if a minimum input voltage is available at an input of the cold-start voltage converter and if the supply voltage for the controller $V_{sup}$ is lower than the minimum required supply voltage $V_{CS}$.

Generally, the PMIC according to the invention comprises a first power transfer path for transferring power from the main voltage converter system to the first storage device terminal and/or a second power transfer path for transferring power from the main voltage converter system to the auxiliary terminal or to the integrated on-chip capacitor.

The PMIC according to the invention is characterized in that it comprises an internal node electrically connected with the auxiliary terminal 9 or the integrated on-chip capacitor $C_{int}$ such that an auxiliary voltage $V_{aux}$ of the internal node corresponds to a voltage at the auxiliary terminal or corresponds to a voltage of the integrated on-chip capacitor $C_{int}$, and wherein the internal node $N_{aux}$ is further electrically connected with the supply input of the controller such that the supply voltage at the input of the controller corresponds to the auxiliary voltage $V_{aux}$. The internal node $N_{aux}$ is electrically separated from the first storage device terminal such that the auxiliary voltage $V_{aux}$ is independent from a voltage at the first storage device terminal.

The PMIC also comprises a monitoring unit coupled with the controller and configured for monitoring the auxiliary voltage $V_{aux}$ of the internal node and for monitoring a first storage parameter $V_{Batt1}$ at the first storage device terminal, preferably the first storage parameter $V_{Batt1}$ corresponds to a voltage sensed at the first storage device terminal. In embodiments, the monitoring unit comprises a signal comparator for comparing the auxiliary voltage with predefined supply threshold voltages and comparing the first storage parameter with predefined storage threshold values.

The controller of the PMIC according to the invention is configured for operating the main voltage converter system for transferring power via the first power transfer path to the first storage device terminal as long as the first storage parameter is below a predefined upper storage value.

In embodiments, the controller is further configured for operating the main voltage converter system for transferring power via the second power transfer path to the auxiliary terminal or to the integrated on-chip capacitor for maintaining the auxiliary voltage $V_{aux}$ equal to a target value, or alternatively maintaining the auxiliary voltage $V_{aux}$ within a voltage range defined between a lower threshold voltage $V_{sup-min}$ and an upper threshold voltage $V_{sup-max}$, with the lower threshold voltage $V_{sup-min}$ being higher than the minimum required supply voltage $V_{CS}$. In other embodiments, the controller is configured for enabling operating the cold-start voltage converter for transferring power to the auxiliary terminal or to said integrated on-chip capacitor, so as to maintain said auxiliary voltage $V_{aux}$ equal to the target value or within the voltage range.

In embodiments, the controller of the PMIC according to the invention is further configured for disabling operation of the cold-start voltage converter and enabling operation of the main voltage converter system if the auxiliary voltage $V_{aux}$ has increased from a value below the minimum required supply voltage $V_{CS}$ to a predefined switching voltage $V_{SW}$, with $V_{SW} \geq V_{CS}$.

In embodiments, if the auxiliary voltage has dropped below the lower threshold voltage $V_{sup-min}$, then the controller is operating the main voltage converter system for transferring power to the auxiliary terminal or to the integrated on-chip capacitor until the auxiliary voltage has increased to the upper threshold voltage $V_{sup-max}$. Alternatively, the controller is operating the main voltage converter for maintaining the auxiliary voltage $V_{aux}$ continuously equal to the lower threshold voltage $V_{sup-min}$.

In embodiments, the main voltage converter system of the PMIC comprises an input selection circuit controlled by the controller. The input selection is configured for selecting an input path from a plurality of input paths such that the main voltage converter system is receiving input power via the input path selected. The plurality of input paths for the main controller comprise at least a first input path configured for electrically connecting the first input terminal with an input of the main voltage converter system.

In embodiments, the plurality of input paths for the main voltage converter system comprises at least a first input path for receiving input power through the first input terminal and a second input path configured for receiving input power through a further input terminal of the PMIC. In further embodiments the second input path is an internal path of the PMIC for transferring power from the first output terminal to the input of the main voltage converter system.

In these embodiments comprising a first and a second input path, the controller is further configured for controlling the main voltage converter system and the input selection circuit for performing a further step of: if i) the auxiliary voltage has dropped from a value higher than the lower threshold voltage to a predefined critical threshold voltage, with $V_{CS} < V_{T-B} < V_{sup-min}$, wherein $V_{CS}$, $V_{T-B}$ and $V_{sup-min}$ are respectively the minimum required supply voltage, the critical threshold voltage and the lower threshold voltage, or, alternatively, if ii) the auxiliary voltage has dropped below the lower threshold voltage and the monitoring unit detects that no input power is available at the first input terminal, then selecting the second input path, selecting the second power transfer path, and operating the main voltage converter system until the auxiliary voltage has increased to the upper threshold voltage.

In embodiments, the main voltage converter system comprises a first voltage converter and a second voltage converter. The first voltage converter has an output coupled to the first storage device terminal through the first power transfer path and an input connected with the first power input terminal. The second voltage converter has an output coupled to the integrated on-chip capacitor or to the auxiliary terminal through the second power transfer path and an input connected to either one of: the first power input terminal, the first storage device terminal, or an additional power input terminal. Advantageously the two voltage converters can operate independently. In embodiments, the two voltage converters of the voltage converter system can operate simultaneously.

In embodiments, the power management integrated circuit comprises a second storage device terminal connectable with a second rechargeable energy storage device, a third power transfer path for transferring power from the main voltage converter system to the second storage device terminal, and wherein the controller is configured for operating the main voltage converter system for transferring power from the first power input terminal to the second storage device terminal if the first storage parameter $V_{BATT1}$ has reached the predefined upper storage value $V_{BATT1}$-up.

In embodiments, the controller of the power management integrated circuit according to the invention is configured for disabling operation of the cold-start voltage converter and enabling operation of the main voltage converter system if the auxiliary voltage $V_{aux}$ has increased from a value below the minimum required supply voltage $V_{CS}$ to a predefined switching voltage $V_{SW}$ equal or larger than the minimum required supply voltage $V_{CS}$.

SHORT DESCRIPTION OF THE DRAWINGS

Figure 2:
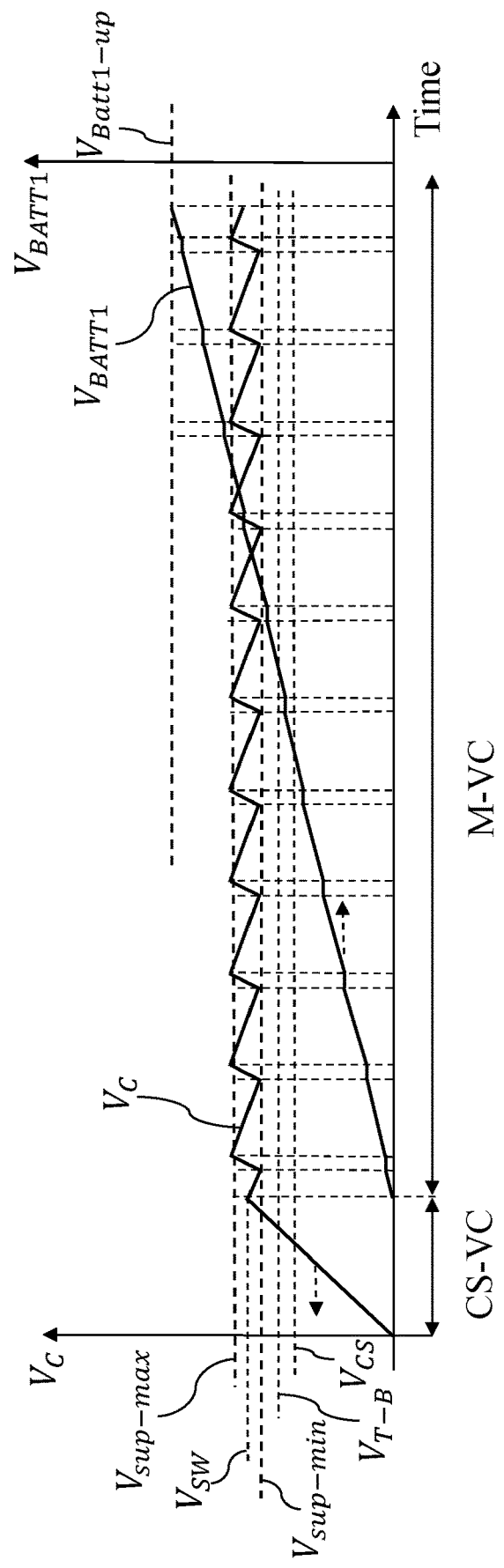
Figure 3A:
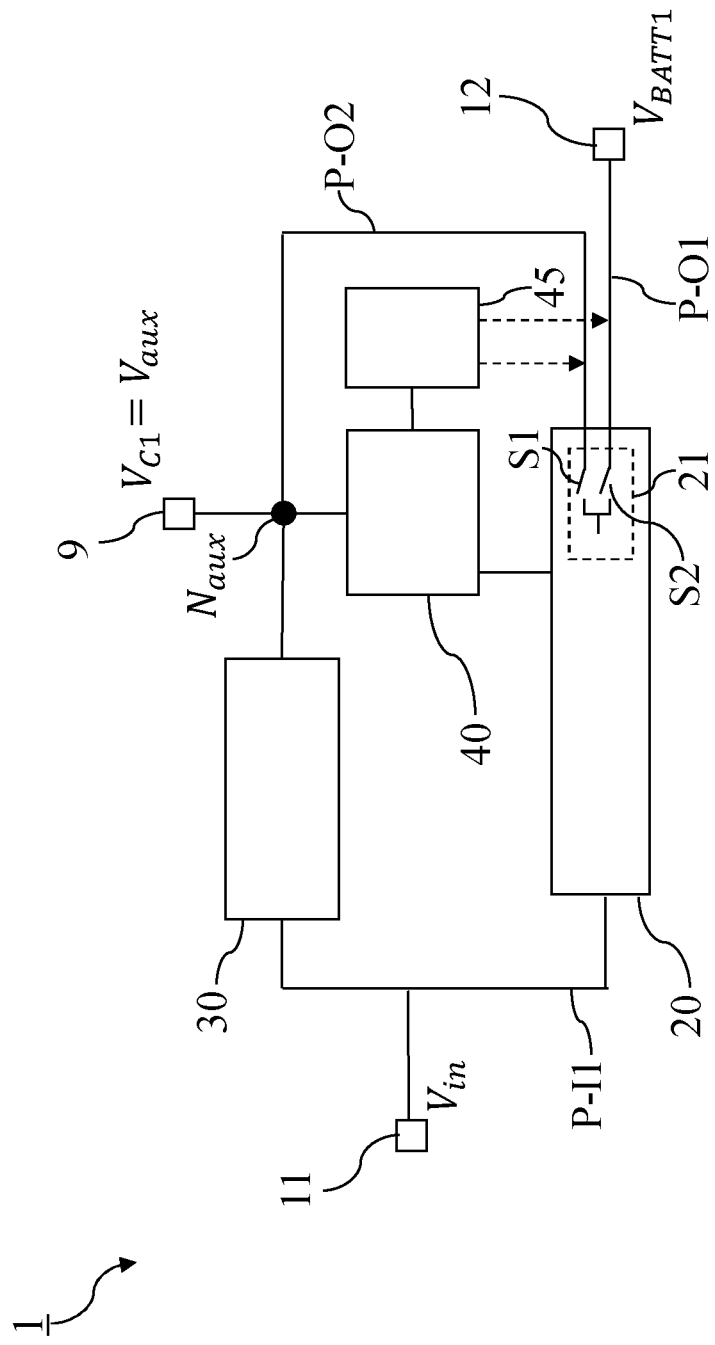
Figure 3B:
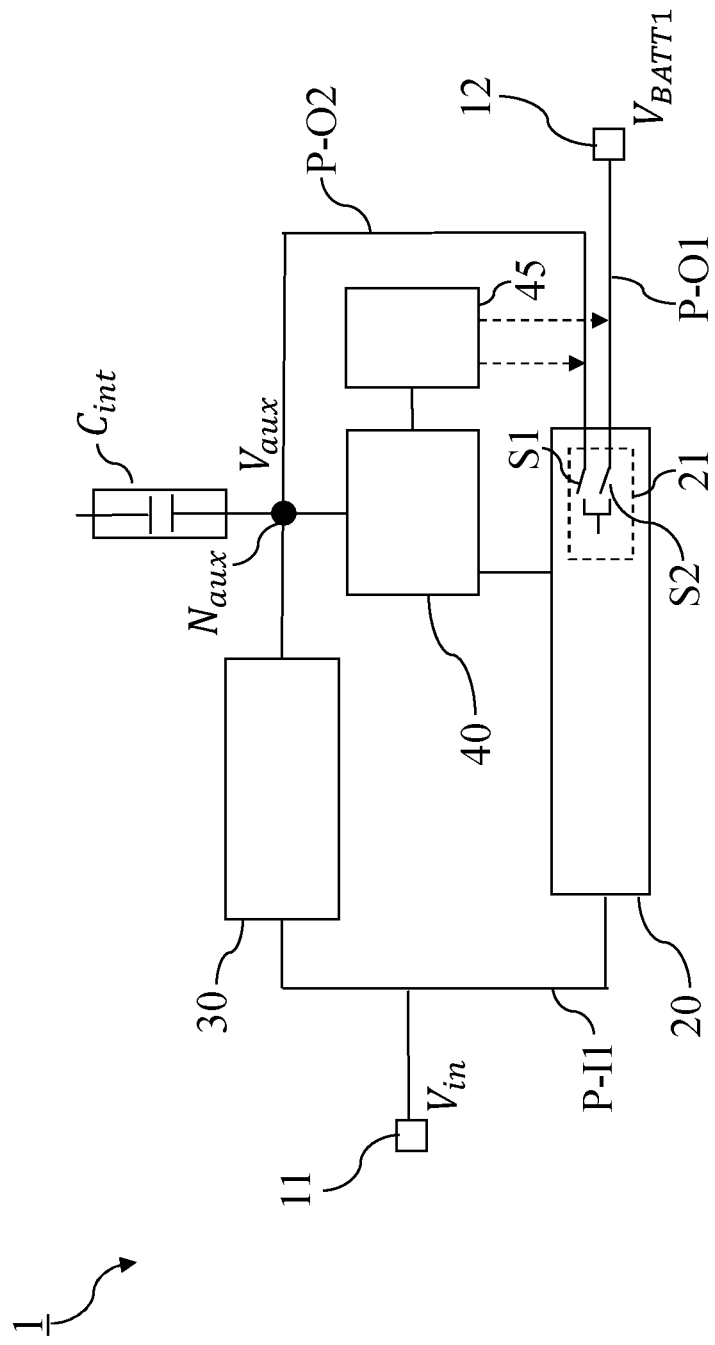
Figure 3C:
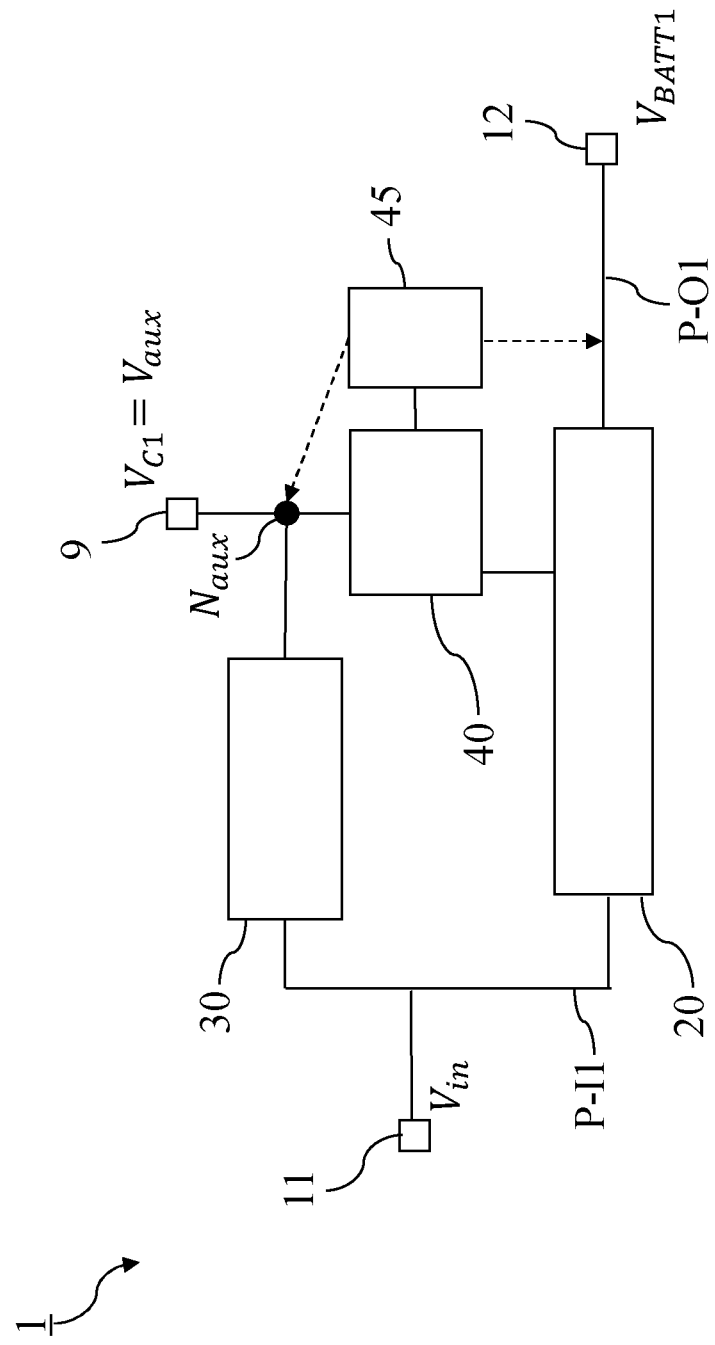
Figure 4:
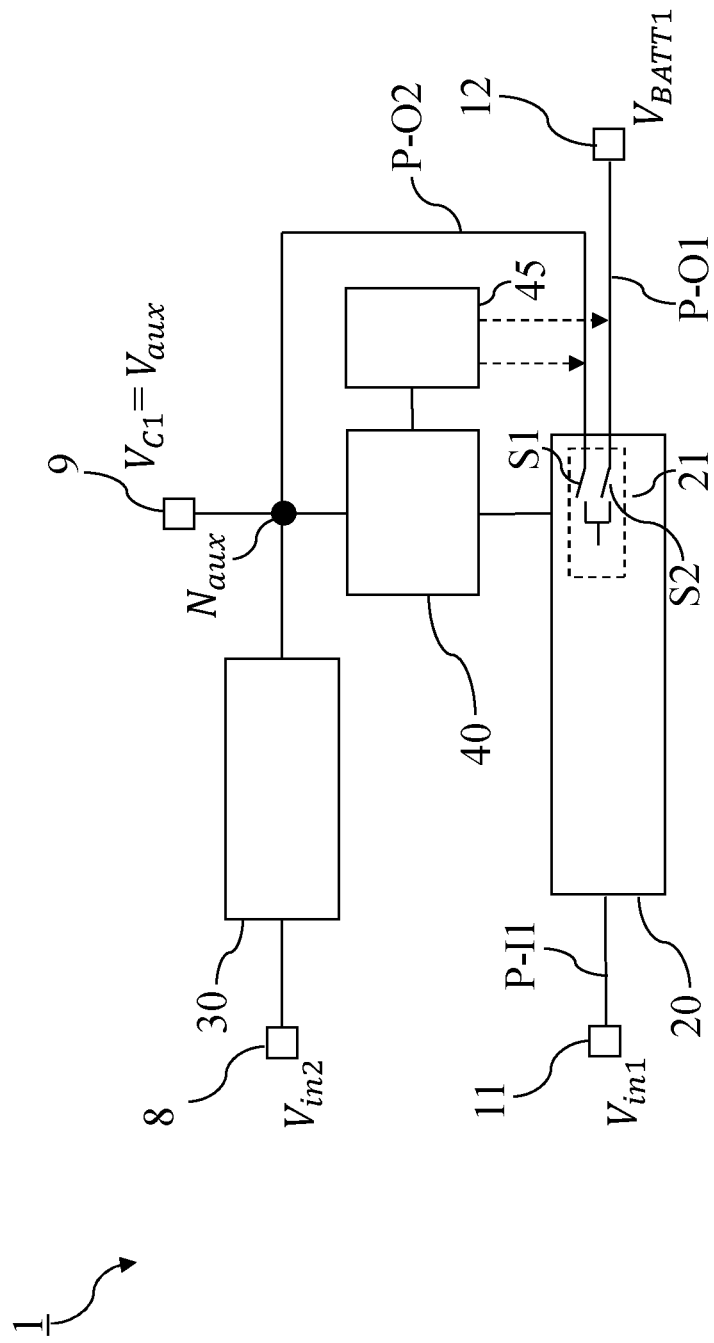
Figure 5:
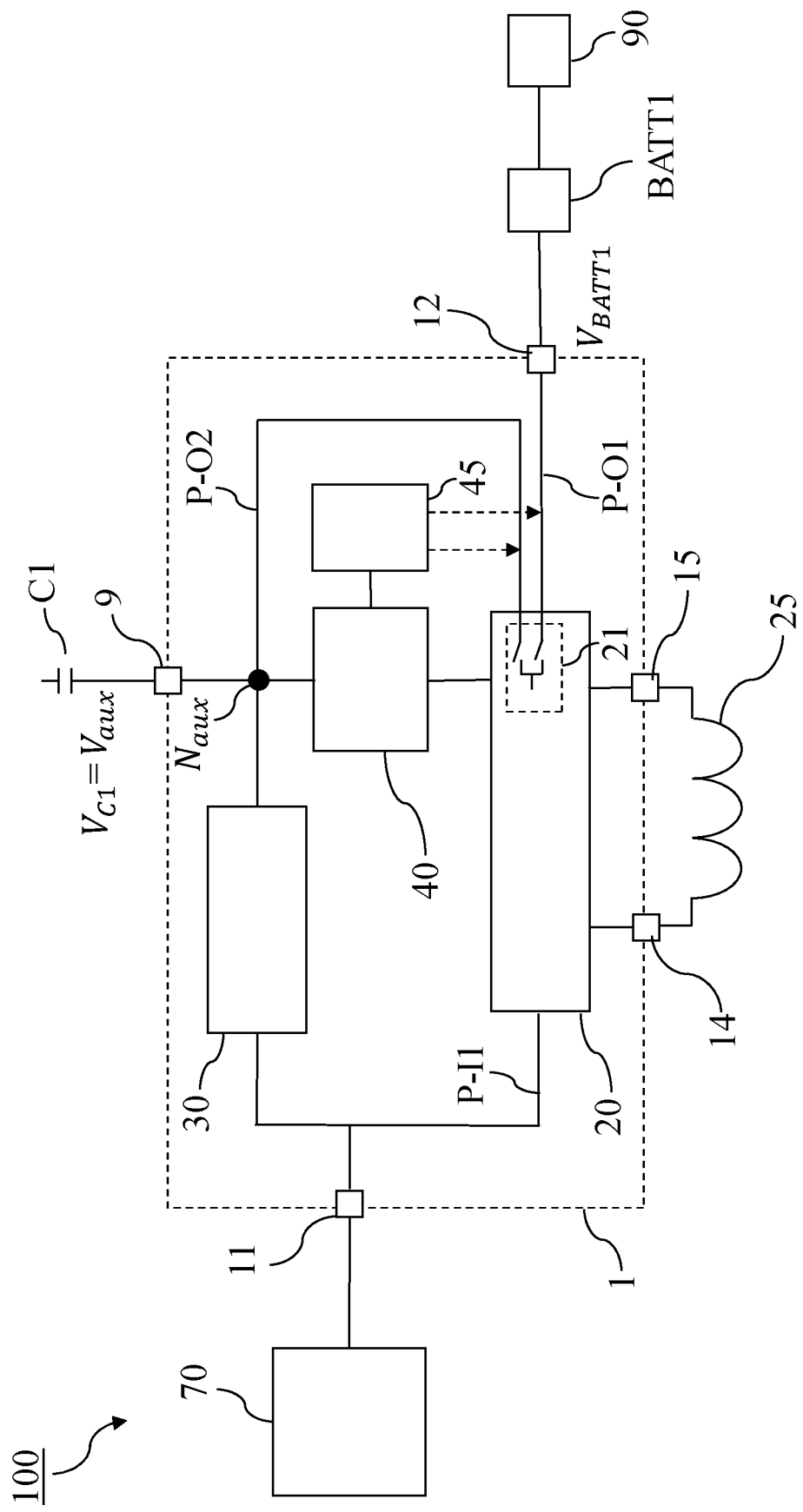
Figure 6:
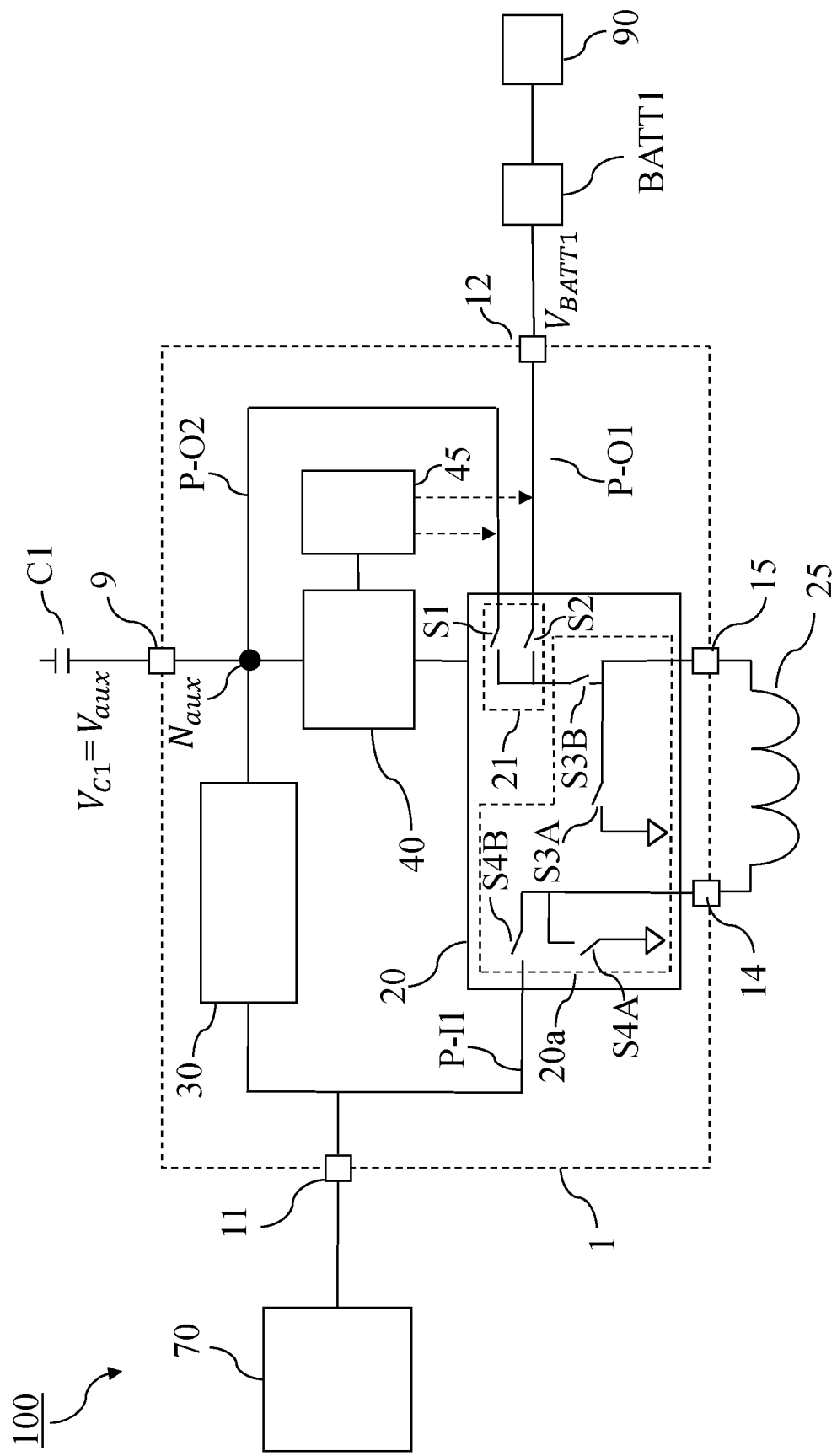
Figure 7:
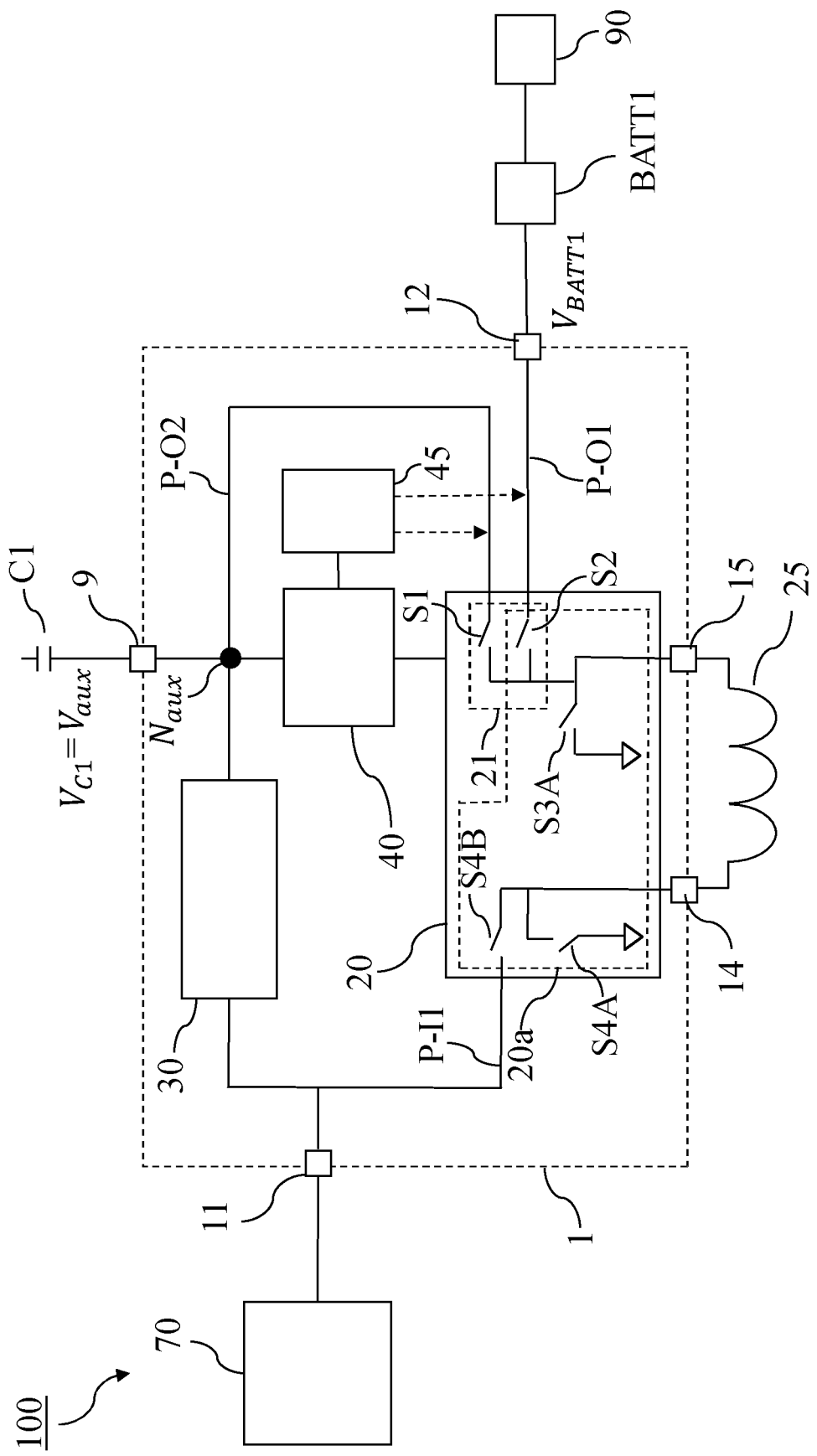
Figure 8:
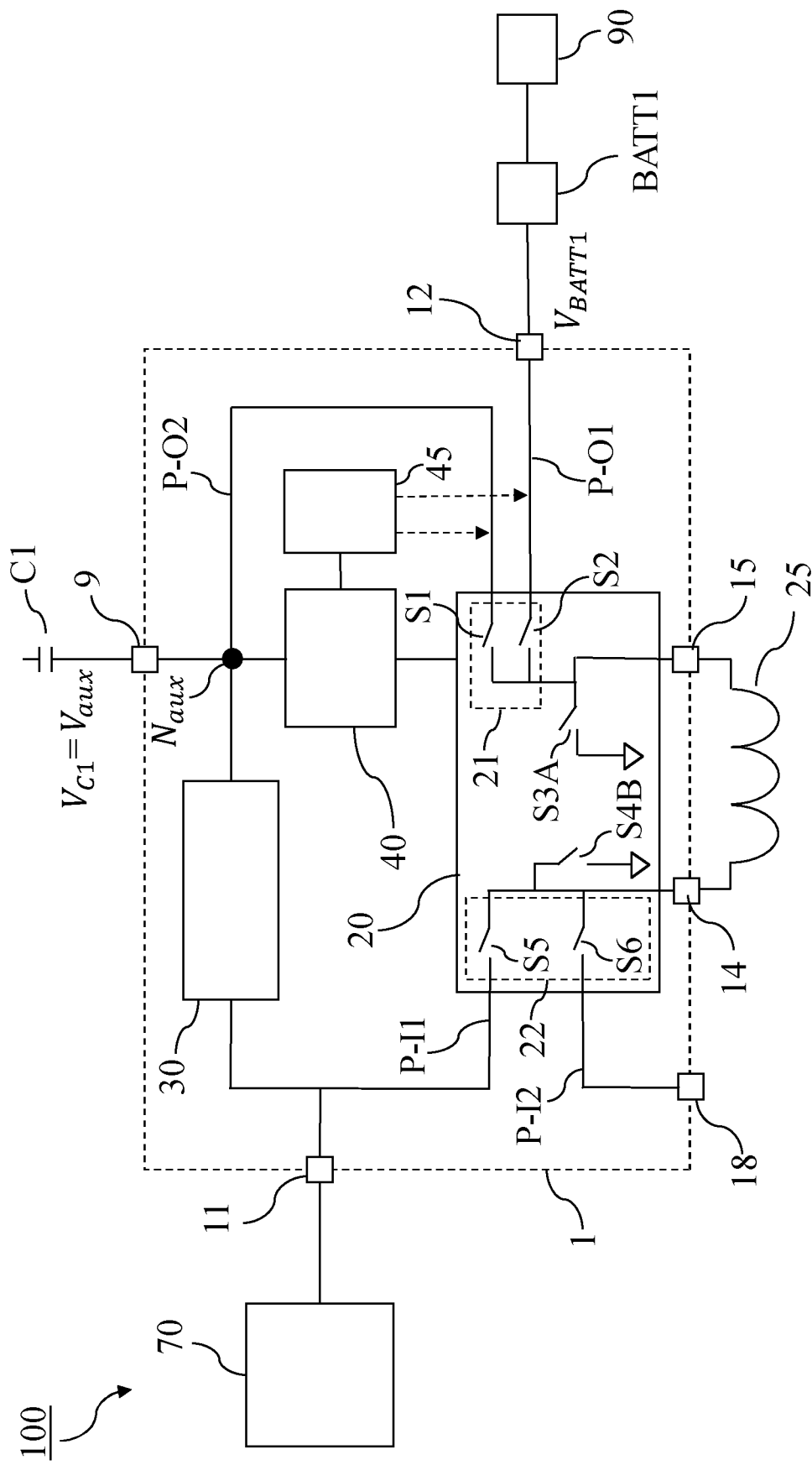
Figure 9:
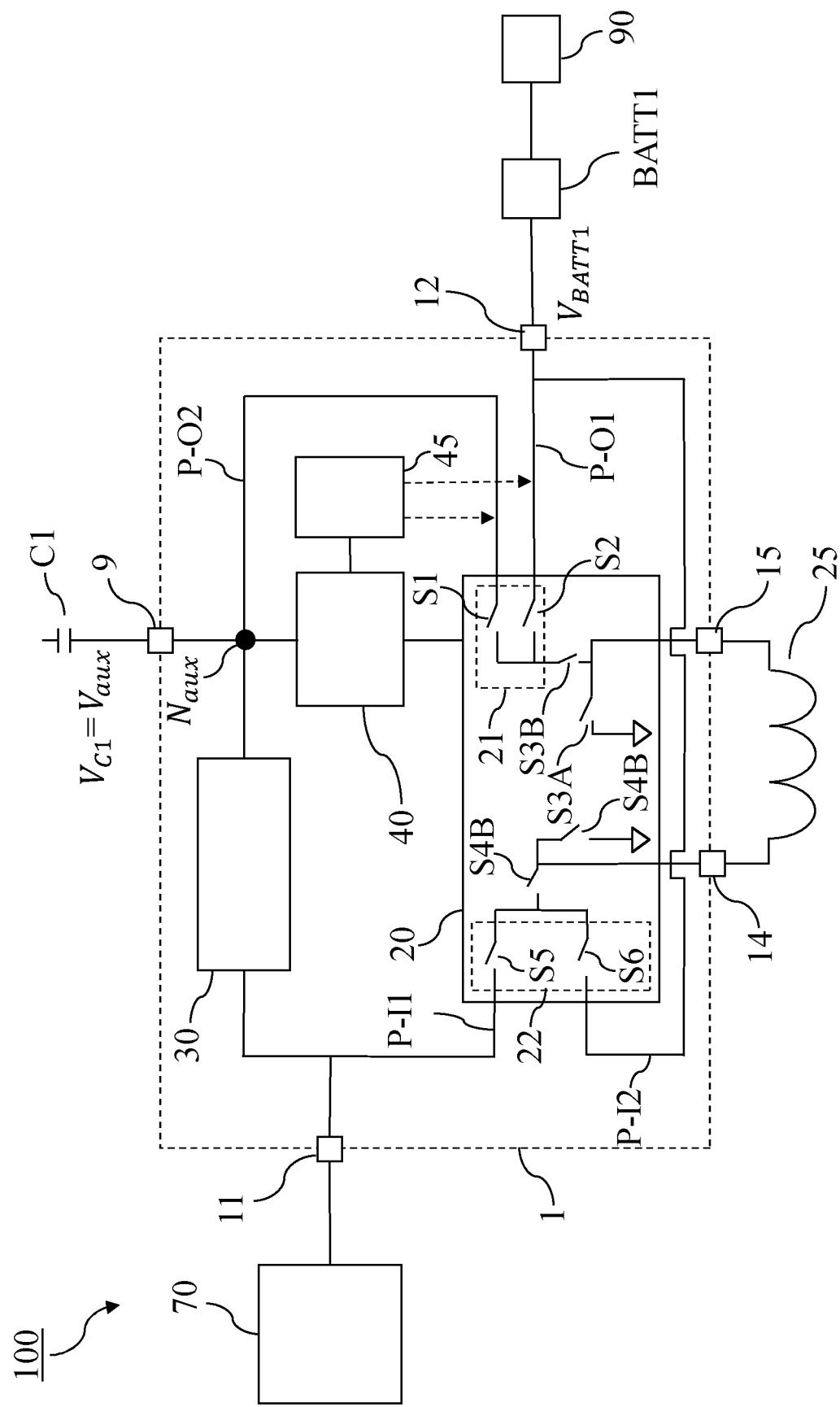
Figure 10:
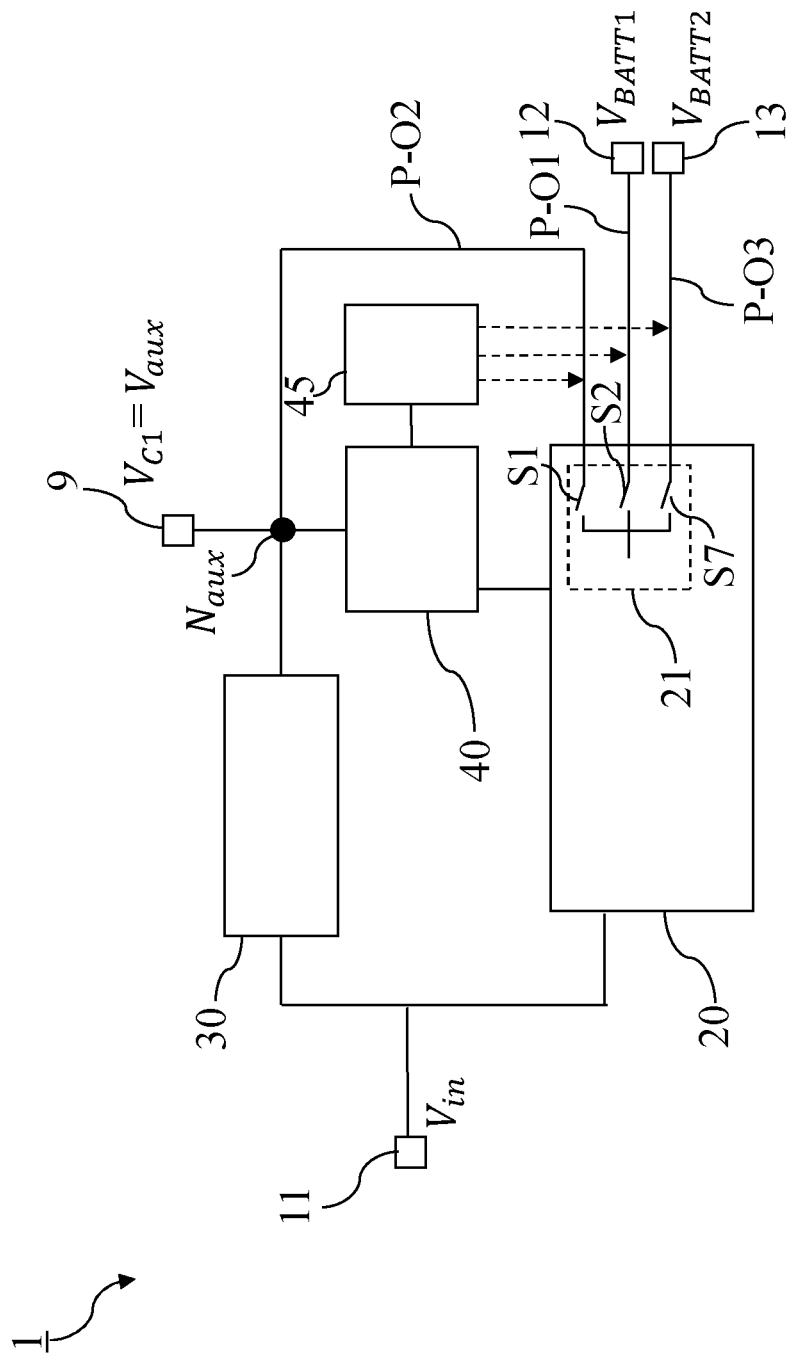
Figure 11:
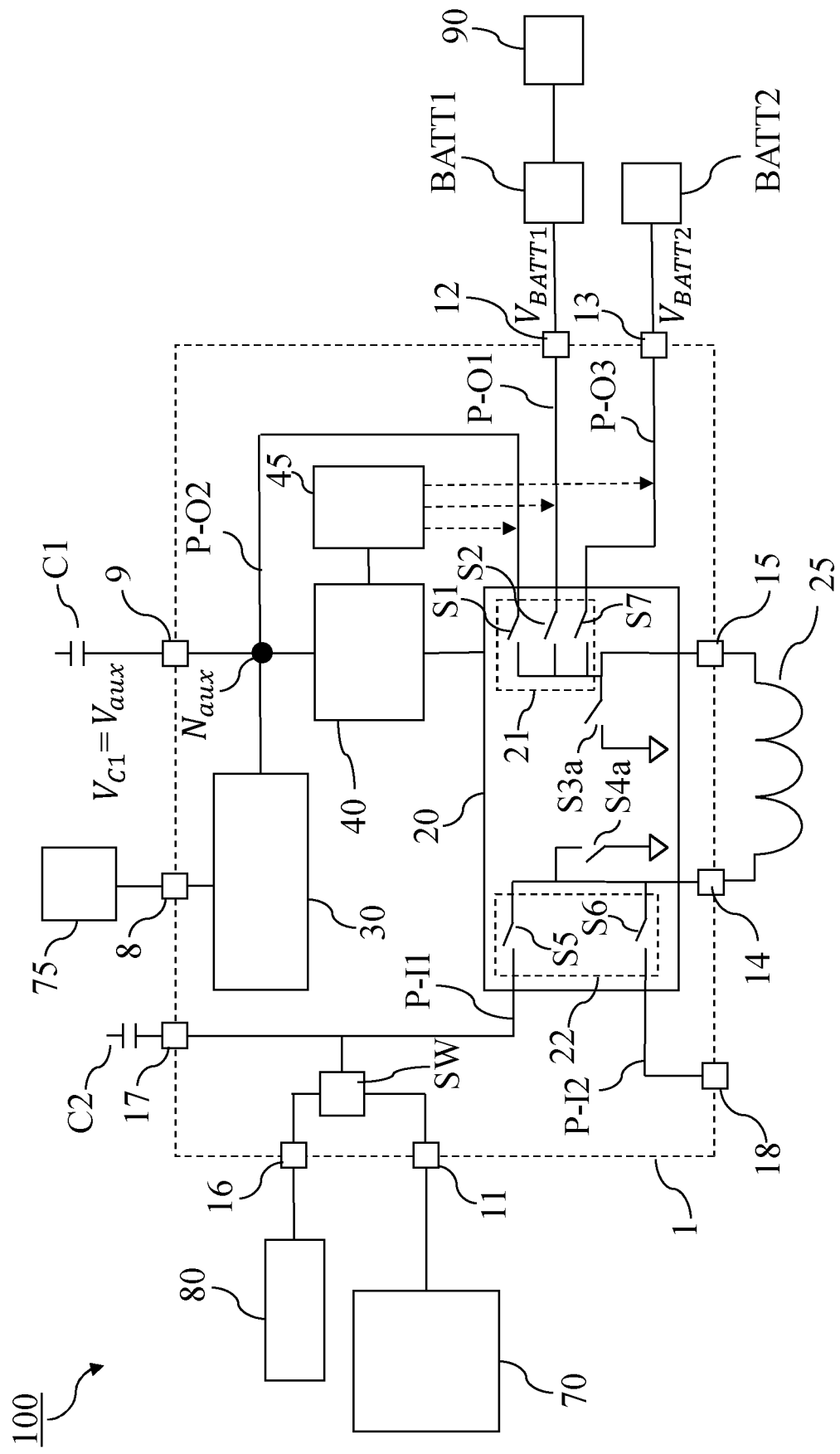
Figure 12:
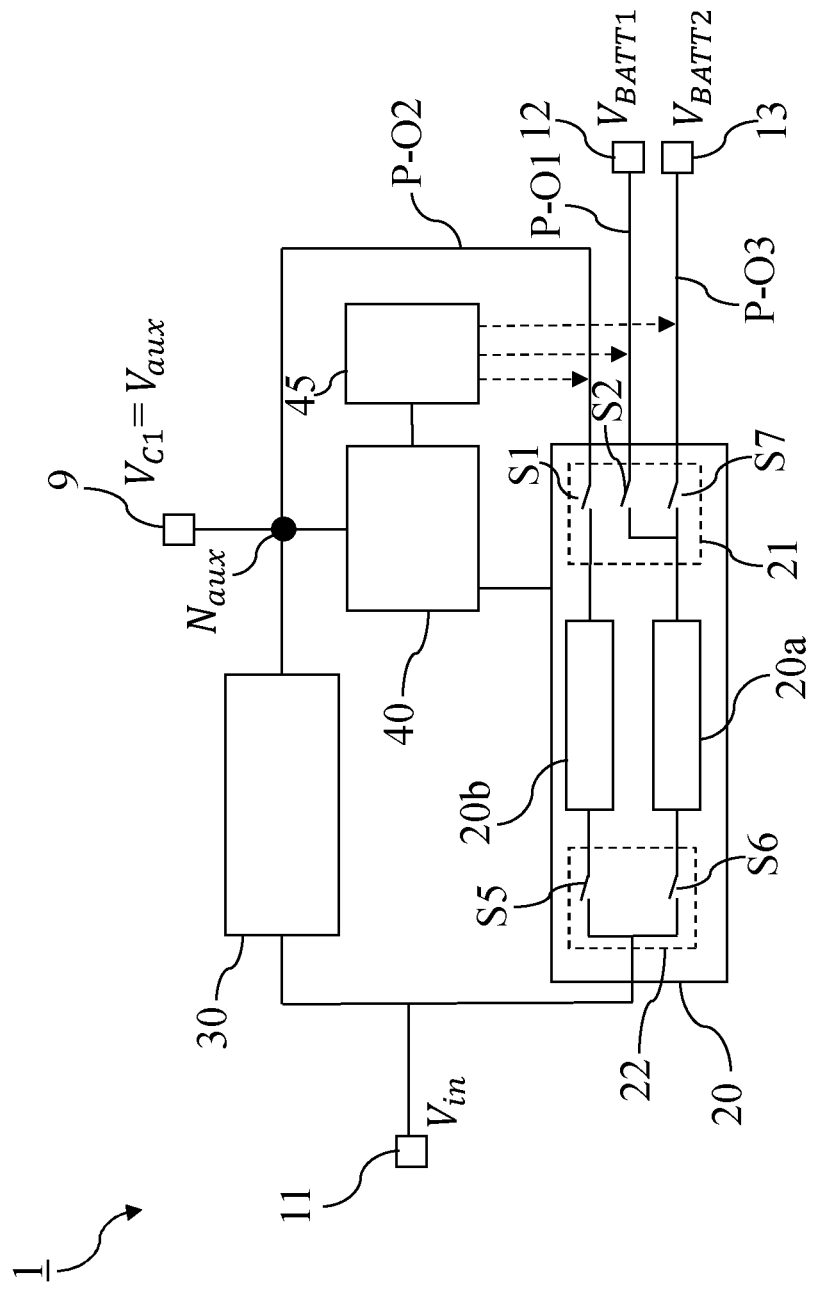
Figure 13:
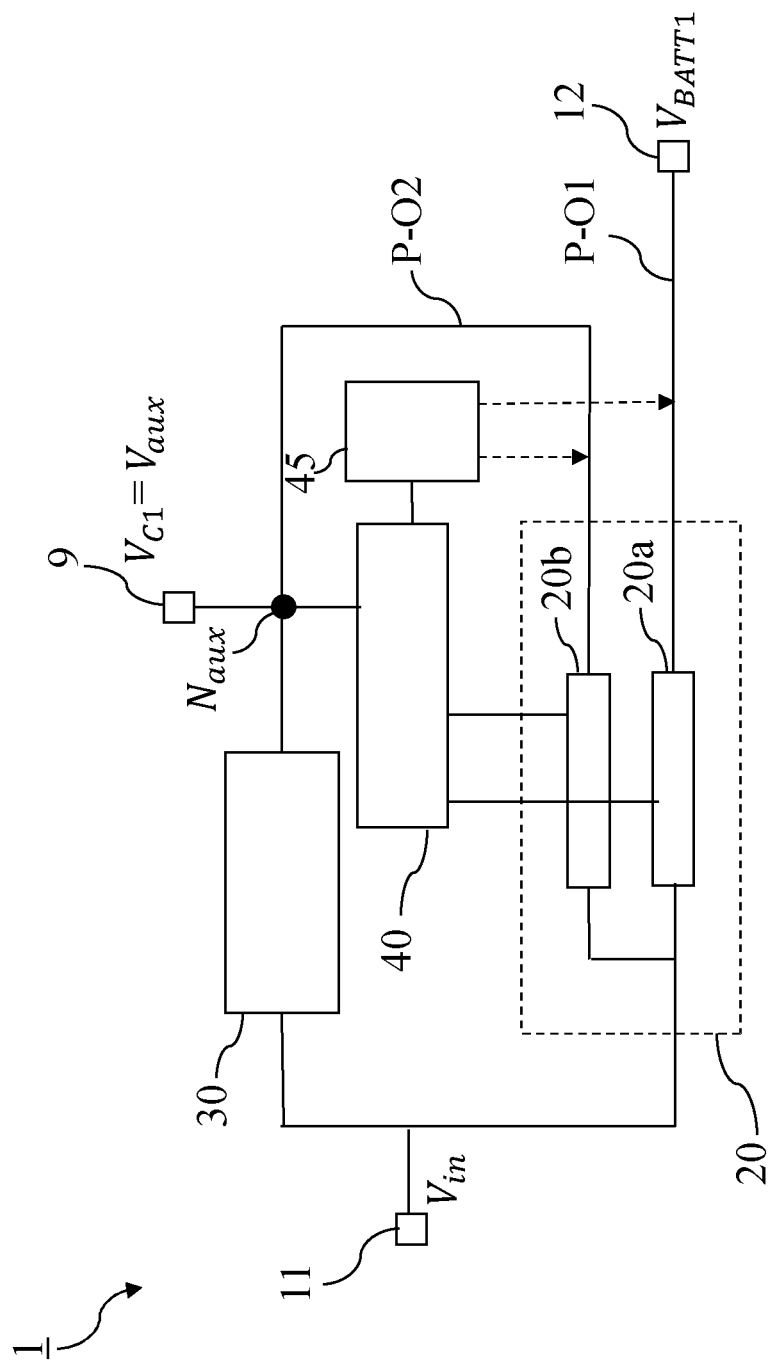
Figure 14:
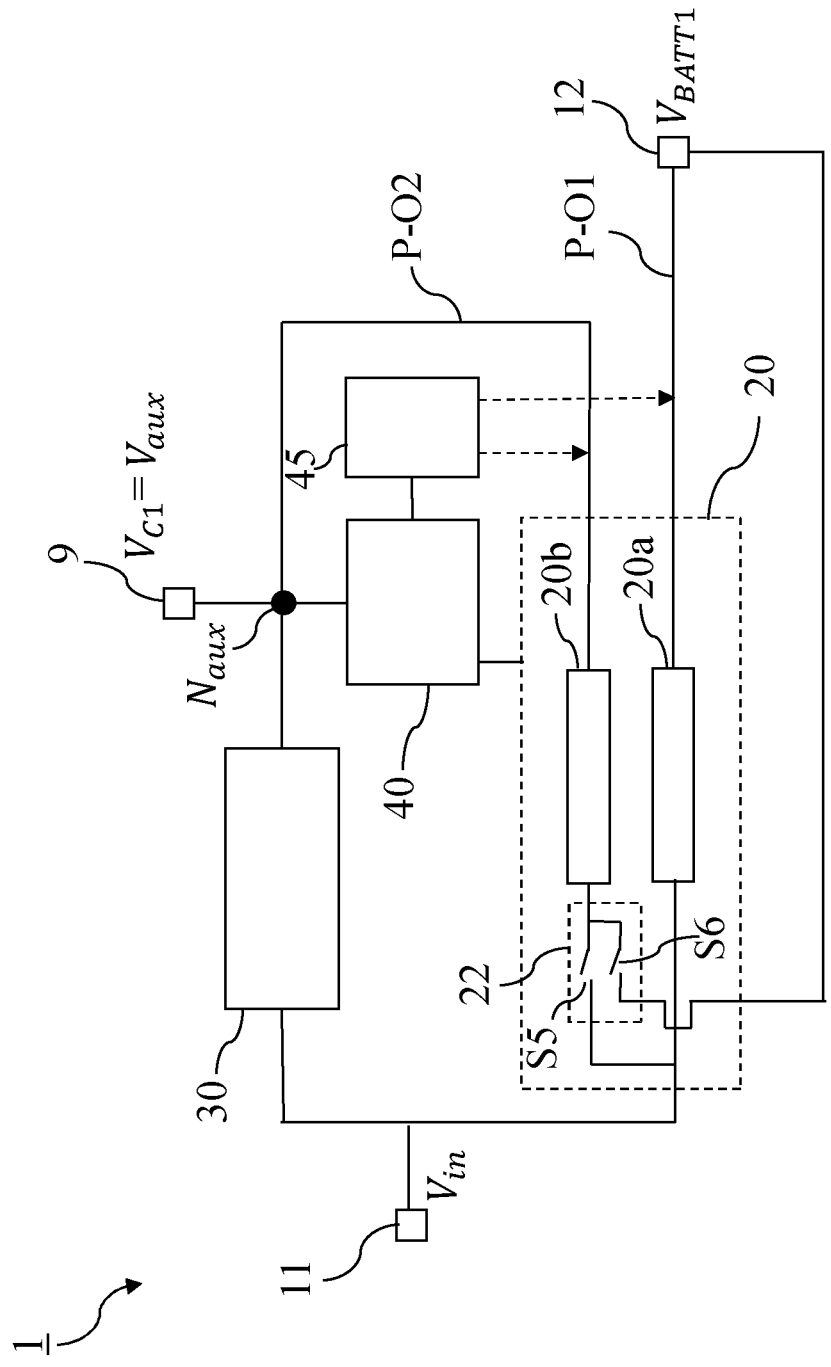
Figure 15:
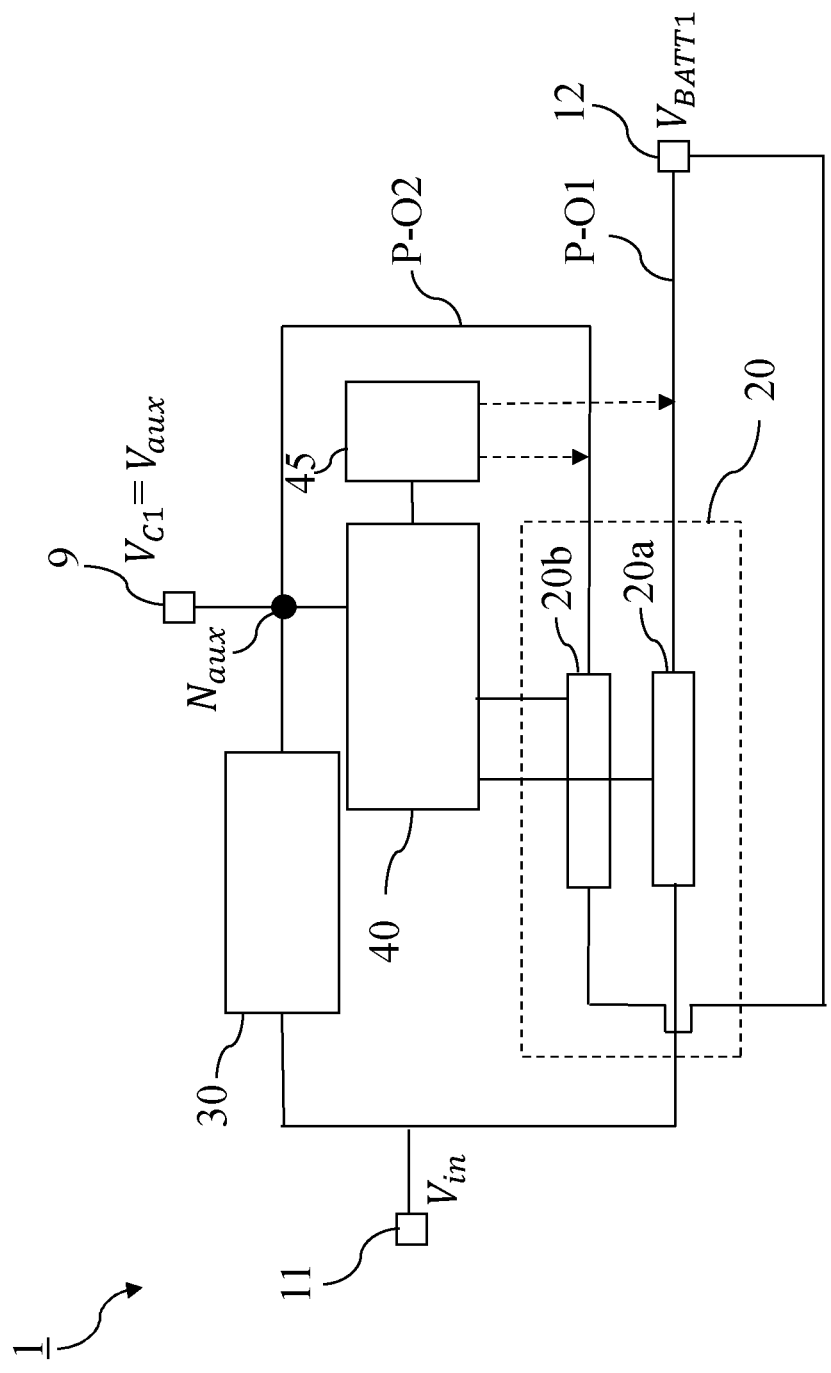

These and further aspects of the invention will be explained in greater detail by way of example and with reference to the accompanying drawings in which:

FIG. 1 schematically represents an energy harvesting system according to the present disclosure, FIG. 2 illustrates a start-up process for charging a rechargeable energy storage device using the method according to the present invention, FIG. 3a schematically shows an embodiment of a power management integrated circuit according to the invention having an auxiliary terminal for connecting an auxiliary rechargeable energy storage device, FIG. 3b schematically shows an embodiment of a power management integrated circuit according to the invention having an integrated on-chip capacitor, FIG. 3c schematically shows an embodiment of a power management integrated circuit wherein a cold-start voltage converter and a main voltage converter system are used for transferring power to respectively an auxiliary terminal and a storage device terminal, FIG. 4 schematically shows an embodiment of a power management integrated circuit according to the invention having a first power input terminal and a second power input terminal, FIG. 5 schematically illustrates an example of an energy harvesting system comprising a power management integrated circuit according to the invention, FIG. 6 schematically shows a first example of an energy harvesting system wherein the main voltage converter system of the PMIC comprises a buck/boost voltage converter, FIG. 7 schematically shows a second example of an energy harvesting system wherein the main voltage converter system of the PMIC comprises a buck/boost voltage converter, FIG. 8 schematically shows an example of an energy harvesting system wherein the main voltage converter system of the PMIC comprises an input selection circuit and the PMIC comprises an additional input terminal and a second input path connecting the additional input terminal with the input selection circuit, FIG. 9 schematically shows an example of an energy harvesting system wherein the main voltage converter system of the PMIC comprises an input selection circuit and the PMIC comprises a second input path connecting the first storage device terminal with the input selection circuit, FIG. 10 schematically shows an example of a power management integrated circuit comprising a first and a second storage device terminal, FIG. 11 schematically illustrates an example of an energy harvesting system comprising a first and a second rechargeable energy storage device, FIG. 12 schematically illustrates a first embodiment of a power management system wherein a main voltage converter system comprising a first voltage converter and a second voltage converter, FIG. 13 illustrates a second embodiment of a power management integrated circuit wherein the voltage converter system comprises two voltage converters, FIG. 14 illustrates a third embodiment of a power management integrated circuit wherein the voltage converter system comprises two voltage converters and wherein the first voltage converter comprises an input selection circuit, FIG. 15 illustrates a fourth embodiment of a power management integrated circuit wherein the voltage converter system comprises two voltage converters and wherein the first output terminal of the PMIC is connected with an input of the first voltage converter.

The drawings of the figures are neither drawn to scale nor proportioned. Generally, identical components are denoted by the same reference numerals in the figures.

DETAILED DESCRIPTION OF EMBODIMENTS OF THE INVENTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

With the method according to the present disclosure, energy is acquired from an energy harvester and used to charge a first rechargeable energy storage device. The method makes use of a system for energy harvesting.

In FIG. 1, an example of a system 100 for energy harvesting is schematically shown. The system 100 has a power management integrated circuit (PMIC) 1 comprising a main voltage converter system 20 and a controller 40 for controlling the main voltage converter system. An energy harvester 70 is coupled to a first power input terminal 11, for supplying power from the energy harvester to the PMIC at an input voltage $V_{in}$. The PMIC 1 comprises at least a power output terminal 12 that is coupled to a first rechargeable energy storage device BATT1 such that power can be outputted and the first rechargeable energy storage device BATT1 can be charged with energy from the energy harvester. In this example, an application load 90 is coupled to the first rechargeable energy storage device BATT1. The PMIC shown on FIG. 1 further comprises a cold-start voltage converter 30 that is being used when the main voltage converter system is not operable, i.e. when no supply power is available to power the controller. Indeed, the controller is operable if a supply voltage $V_{sup}$ at a supply input of the controller is equal or above a minimum required supply voltage $V_{CS}$.

The main voltage converter system 20 has to be construed as a system for converting input power received from an energy source such as an energy harvester into output power for charging a storage device. Typically, the main voltage converter system comprises one or more voltage converters and detailed embodiments of various voltage converter systems will be further described below. An example of a voltage converter known in the art is a DC-DC boost converter, a DC-DC buck converter or a DC-DC buck/boost converter.

The first rechargeable energy storage device BATT1 is for example a rechargeable battery, a capacitor or supercapacitor.

The method for energy harvesting according to the present invention comprises steps of coupling the energy harvester 70 to an input of the main voltage converter system, coupling a first rechargeable energy storage device BATT1 to an output of the main voltage converter system, coupling the energy harvester 70 or another energy source to an input of the cold-start voltage converter, coupling an auxiliary rechargeable energy storage device C1 to an output of the cold-start voltage converter, coupling the auxiliary rechargeable energy storage device C1 to a supply input of the controller such that the auxiliary rechargeable energy storage device C1 when charged is being used as a voltage source for the controller. By coupling the auxiliary rechargeable energy storage device C1 to the supply input of the controller the supply voltage $V_{sup}$ corresponds to an auxiliary voltage $V_C$ of the auxiliary rechargeable energy storage device.

The method according to the invention further comprises steps of monitoring the auxiliary voltage $V_C$ of the auxiliary rechargeable energy storage device C1, monitoring a first storage parameter $V_{Batt1}$ indicative of a charging level of the first rechargeable energy storage device BATT1, charging the auxiliary rechargeable energy storage device C1 by operating the cold-start voltage converter until the auxiliary voltage $V_C$ has reached a predefined switching voltage $V_{SW}$ with $V_{SW} \geq V_{CS}$, enabling operation of the main voltage converter system and disabling operation of the cold-start voltage converter if the auxiliary voltage $V_C$ has reached the predefined switching voltage $V_{SW}$ and charging the first rechargeable energy storage device BATT1 by operating the main voltage converter system as long as the parameter $V_{Batt1}$ is below a predefined upper storage value $V_{Batt1-up}$.

This upper storage value $V_{Batt1-up}$ has to be construed as a threshold value indicating that the first rechargeable energy storage device BATT1 is charged.

In embodiments, the first storage parameter $V_{Batt1}$ corresponds to a voltage of the first rechargeable energy storage device BATT1. In other embodiments, the first storage parameter $V_{Batt1}$ corresponds to an accumulated charge acquired by for example a charge counter counting accumulated charges during the charging process of the first rechargeable energy storage device BATT1.

In embodiments, the auxiliary voltage $V_C$ of the auxiliary energy storage device C1 is maintained equal to a target value. The target value is for example a predefined voltage value corresponding to a suitable voltage value for operating the controller. In embodiments, the target value is a suitable or an optimum supply voltage value for operating the controller. To maintain the auxiliary voltage $V_C$ equal to the target value, the main voltage converter system or the cold-start voltage converter is used for recharging the auxiliary rechargeable energy storage device C1 with energy from the energy harvester 70.

This maintenance of the auxiliary voltage $V_C$ is performed for example during the charging period of the first rechargeable energy storage device BATT1 until the upper storage value $V_{Batt1-up}$ is reached and also during any period thereafter.

In embodiments, a decrease of charges of the auxiliary energy storage device C1 is continuously compensated such that the auxiliary voltage $V_C$ remains equal to the target value.

In other embodiments, the main voltage converter system, or alternatively the cold-start voltage converter, is operated for maintaining the auxiliary voltage $V_C$ of the auxiliary energy storage device C1 within a voltage range defined between a lower threshold voltage $V_{sup-min}$ and an upper threshold voltage $V_{sup-max}$, and wherein $V_{CS} < V_{sup-min} < V_{sup-max}$. Generally, $V_{CS} < V_{SW} \leq V_{sup-max}$ and more preferably, $V_{sup-min} \leq V_{SW} \leq V_{sup-max}$. In other words, the lower threshold voltage $V_{sup-min}$ is equal or lower than the predefined switching voltage $V_{SW}$ and higher than the minimum required supply voltage $V_{CS}$.

In embodiments, the voltage range defined by the lower threshold voltage $V_{sup-min}$ and the upper threshold voltage $V_{sup-max}$ corresponds to a range of voltages that are optimum as a supply voltage for operating the controller.

In these embodiments wherein the auxiliary voltage $V_C$ is maintained within a predefined voltage range, if the auxiliary voltage $V_C$ has dropped below the lower threshold voltage $V_{sup-min}$, the method provides a step of recharging the auxiliary rechargeable energy storage device C1 with energy from the energy harvester until the auxiliary voltage $V_C$ has reached an upper threshold voltage $V_{sup-max}$ higher than the lower threshold voltage $V_{sup-min}$.

In FIG. 2, an example of a process for charging the first rechargeable energy storage device according to the method of the present disclosure is schematically illustrated. The variation of the first storage parameter $V_{Batt1}$, in this example a voltage $V_{Batt1}$, and the auxiliary $V_C$ are shown as function of time, illustrating the charging of the first rechargeable energy storage device BATT1 while keeping the auxiliary voltage of the auxiliary energy storage device C1 between the lower and upper threshold voltages $V_{sup-min}$ and $V_{sup-max}$. Initially, the auxiliary voltage $V_C$ is lower than the lower threshold voltage $V_{sup-min}$ and during that start-up period, indicated by "CS-VC" on FIG. 2, the cold start voltage converter, is operating to charge the auxiliary energy storage device C1 until the switching voltage $V_{SW}$ is reached, with in this example $V_{sup-min} \leq V_{SW} \leq V_{sup-max}$. Thereafter, the main voltage converter system starts operating and this period is indicated on FIG. 2 by "M-VC". In the embodiment, as illustrated on FIG. 2, if the auxiliary voltage $V_C$ drops to the lower threshold voltage $V_{sup-min}$ then the main voltage converter system repetitively stops charging the first rechargeable energy storage device and instead recharges the auxiliary energy storage device until the upper threshold voltage $V_{sup-max}$ is reached. As mentioned, above, in other embodiments, not shown on FIG. 2, instead of maintaining the auxiliary voltage $V_C$ within a voltage range, the auxiliary voltage $V_C$ can also be maintained equal to a target value.

As further illustrated on FIG. 2, the main voltage converter system charges the first rechargeable energy storage device BATT1 until an upper storage value $V_{Batt1-up}$ is reached. In this example, where $V_{Batt1}$ is a voltage, the upper storage value $V_{Batt1-up}$ is a voltage that is larger than the upper threshold voltage $V_{sup-max}$ of the auxiliary energy storage device C1. Indeed, as the auxiliary energy storage device is maintained electrically separated from the first rechargeable energy storage device, the voltages $V_{sup}$ and $V_{Batt1}$ are independent of each other and hence can at any time have different values.

In embodiments, the upper threshold voltage $V_{sup-max}$ can be equal to for example a value between 2 V and 3 V, for example 2.5 V, and the first energy storage device BATT1 can be charged up to an upper threshold voltage $V_{Batt1-up}$ equal to for example 4.5 V. In other embodiments, $V_{Batt1-up}$ can be lower than $V_{sup-max}$. For example, in embodiments, $V_{sup-max}$ can be equal to 5 V and $V_{Batt1-up}$ equal to a value lower than 5 V.

In embodiments, when the first rechargeable energy storage device BATT1 is charged up to a battery ready threshold value $V_{Batt1-ready}$, equal or lower than the upper storage value $V_{Batt1-up}$, the stored energy in the first rechargeable energy storage device BATT1 can be used to power an application load.

In embodiments, the first rechargeable energy storage device BATT1 has an energy storage capacity that is more than hundred times, preferably more than thousands times, larger than the energy storage capacity of the auxiliary rechargeable energy storage device C1. In some embodiments, the energy storage capacity of BATT1 can even be million times larger than the storage capacity of C1. In this way, the time to charge the auxiliary energy storage device is very short compared to the charging time of the first rechargeable energy storage device. For example, the auxiliary rechargeable energy storage device C1 can be a capacitor with a storage capacity in the range between 0.1 nanofarad and 100 microfarad and the first rechargeable energy storage device can be a supercapacitor having a storage capacity in the range between 1 microfarad and 100 farad.

As mentioned above, maintaining the auxiliary voltage $V_C$ of the auxiliary rechargeable storage device C1 within the lower $V_{sup-min}$ and upper $V_{sup-max}$ threshold voltages is performed by monitoring the auxiliary voltage $V_C$ during for example the charging process of the first rechargeable energy storage device BATT1 and by recharging the auxiliary energy storage device C1 when the auxiliary voltage $V_C$ drops below the lower threshold voltage $V_{sup-min}$.

In preferred embodiments, the recharging of the auxiliary energy storage device C1 is performed by operating the main voltage converter. In other embodiments, the recharging of the auxiliary energy storage device C1 is performed by operating the cold-start voltage converter.

In some embodiments, as will be discussed below, instead of using energy from the energy harvester, energy from the first rechargeable energy storage device BATT1 can be used as well to recharge the auxiliary energy storage device. Hence, there are at least two options to recharge the auxiliary energy storage device using the main voltage converter system: either with energy from the energy harvester or with energy from the first rechargeable energy storage device. The second option is only possible if the first energy storage device BATT1 is sufficiently charged and has for example reached a voltage that is larger than a lower storage value $V_{Batt1-min}$.

In embodiments, the first option is triggered if the auxiliary voltage $V_C$ drops below the lower threshold voltage $V_{sup-min}$.

In embodiments, the second option is triggered if the auxiliary voltage $V_C$ drops below a predefined critical threshold voltage $V_{T-B}$ with $V_{CS} < V_{T-B} < V_{sup-min}$. Indeed, if the energy harvester is not providing any power, then if the auxiliary voltage $V_C$ drops below the lower threshold voltage $V_{sup-min}$, the auxiliary voltage $V_C$ will continue to drop and finally drop below the critical threshold voltage $V_{T-B}$ such that the second option is being triggered.

In other embodiments, the second option is triggered if the auxiliary voltage $V_C$ drops below the lower threshold voltage $V_{sup-min}$ and if at that moment the energy harvester is monitored not to produce energy or not to produce sufficient energy. The availability of energy from the energy harvester can be monitored with the monitoring unit by monitoring for example an input voltage at the first input terminal or any other parameter indicative of an input power.

The first option of recharging the auxiliary rechargeable storage device C1 with energy from the energy harvester if the auxiliary voltage $V_C$ drops below the lower threshold voltage $V_{sup-min}$ is performed with steps of: decoupling the output of the main voltage converter system from the first rechargeable energy storage device BATT1, coupling the output of the main voltage converter system to the auxiliary rechargeable storage device C1 and operating the main voltage converter system for recharging the auxiliary rechargeable storage device C1 until the auxiliary voltage $V_C$ has reached the upper threshold voltage $V_{sup-max}$. Thereafter, the output of the main voltage converter system is de-coupled from the auxiliary rechargeable energy storage device C1 and coupled to the first rechargeable energy storage device BATT1.

The second option of recharging the auxiliary rechargeable energy storage device C1 with energy from the first rechargeable energy storage device BATT1 if the auxiliary voltage $V_C$ drops below the predefined critical threshold voltage $V_{T-B}$, with $V_{CS} < V_{T-B} < V_{sup-min}$, or if monitored that the energy harvester is not producing energy, is performed with steps of: decoupling the energy harvester from the input of the main voltage converter system, decoupling the first rechargeable energy storage device BATT1 form the output of the main voltage converter system, coupling the first rechargeable energy storage device BATT1 to the input of the main voltage converter system, coupling the output of the main voltage converter system to the auxiliary rechargeable energy storage device C1 and operating the main voltage converter system for recharging the auxiliary rechargeable energy storage device C1 until the auxiliary voltage $V_C$ has reached the upper threshold voltage $V_{sup-max}$. Thereafter, the energy harvester is re-coupled to the input of the main voltage converter system and the first rechargeable storage device BATT1 is re-coupled to the output of the main voltage converter system.

In embodiments wherein the main voltage converter system 20 comprises a buck/boost voltage converter, the buck/boost voltage converter is configured for operating in a buck mode if $V_{in} > (V_{out} + \Delta)$, for operating in a boost mode if $V_{in} < (V_{out} - \Delta)$, and for operating in a buck-boost mode if $V_{in} = V_{out} \pm \Delta$, with $V_{in}$ and $V_{out}$ being respectively the input and output voltage of the main voltage converter system and $\Delta$ being an operational parameter of the buck/boost voltage converter If the energy harvester is for example no longer operable and the first storage parameter $V_{Batt1}$ is for example lower than the predefined lower storage value $V_{Batt1-min}$, then a situation can occur wherein no power is available for recharging the auxiliary energy storage device when the auxiliary voltage $V_C$ has dropped to the lower threshold voltage $V_{sup-min}$ and hence the auxiliary voltage $V_C$ can further decrease below the minimum required supply voltage $V_{CS}$ for operating the controller. As mentioned above, this minimum required supply voltage $V_{CS}$ is a threshold voltage lower than the lower threshold voltage $V_{sup-min}$.

In embodiments wherein the main voltage converter system is operated for maintaining the auxiliary voltage $V_C$ equal to the target value or for maintaining the auxiliary voltage $V_C$ within a voltage range, and if the situation occurs, as mentioned above, wherein the auxiliary voltage $V_C$ has decreased below the minimum required supply voltage $V_{CS}$, then the cold-start voltage converter becomes operable for recharging the auxiliary rechargeable energy storage device C1 until the predefined switching voltage $V_{SW}$ is reached. Thereafter, the operation of the cold-start voltage converter is disabled and the operation of the main voltage converter system is enabled. The minimum required supply voltage $V_{CS}$ is schematically illustrated on FIG. 2.

In embodiments, the main voltage converter system 20 comprises a first voltage converter 20a and a second voltage converter 20b. In these embodiments, the charging of the first rechargeable energy storage device BATT1 with energy from the energy harvester 70 is performed by operating the first voltage converter 20a and the recharging of the auxiliary rechargeable energy storage device C1 is performed with energy from the energy harvester 70 or with energy from the first rechargeable energy storage device BATT1 by operating the second voltage converter 20b. The recharging of the auxiliary rechargeable energy storage device C1 is performed independently from the charging of the first rechargeable energy storage device BATT1, i.e. controlling the charging of the first auxiliary device is not influenced by controlling of the charging of the auxiliary rechargeable storage device and vice versa.

In embodiments wherein the voltage converter used for recharging the auxiliary rechargeable energy storage device C1 is different from the voltage converter used for charging the first rechargeable energy storage device, the charging of the first rechargeable energy storage device BATT1 can be performed simultaneously with the charging of the auxiliary rechargeable energy storage device C1. According to a second aspect of the invention, a power management integrated circuit for energy harvesting is provided which allows to perform the method for energy harvesting discussed above.

The integrated circuit for energy harvesting according to the invention has to be construed as a microchip comprising integrated circuits and a number of input and output pins, also named terminals. The microchip can have for example between 16 and 32 terminals. Generally, the microchip has a compact packaging resulting in a square or rectangular footprint with sides having a length between 1 and 5 mm. Various examples of PMIC's 1 according to the invention are shown on respectively FIG. 3a, FIG. 3b, FIG. 3c, FIG. 4, FIG. 10 and FIG. 12 to FIG. 15 and examples of energy harvester systems 100 comprising a PMIC 1 are illustrated in FIG. 5 to FIG. 9 and FIG. 11. These examples will be further discussed below.

In embodiments, the PMIC 1 for energy harvesting comprises one or more power input terminals for receiving input power from an energy harvester or another power source, a first storage device terminal 12 connectable with a first rechargeable energy storage device BATT1, and an auxiliary terminal 9 connectable with an auxiliary rechargeable energy storage device C1. The auxiliary terminal is an input/output terminal allowing to both transfer charges from the PMIC to the auxiliary rechargeable energy storage device and vice-versa to transfer charges from the auxiliary rechargeable energy storage device to the PMIC. In other embodiments, as illustrated on FIG. 3b, instead of an auxiliary terminal connectable to an external auxiliary rechargeable energy storage device, the PMIC comprises an integrated on-chip capacitor $C_{int}$.

In some embodiments, the first storage device terminal 12 is a power output terminal for outputting power to the first rechargeable energy storage device, and, in other embodiments, the first storage device terminal 12 is an input/output terminal suitable for both outputting power to the first rechargeable energy storage device and for inputting power from the first rechargeable energy storage device to the PMIC.

The PMIC 1 further comprises a main voltage converter system 20 for receiving input power through a first power input terminal 11 of the one or more power input terminals, a controller 40 configured for controlling the main voltage converter system 20, and a cold-start voltage converter 30. The cold-start voltage converter 30 is configured for i) transferring input power to the auxiliary terminal 9 or to the integrated on-chip capacitor $C_{int}$, ii) receiving the input power through the first power input terminal 11 or through a second power input terminal 8 of the one or more power input terminals, and iii) starting operation if a minimum input voltage is available at an input of the cold-start voltage converter and if the supply voltage for the controller $V_{sup}$ is lower than the minimum required supply voltage $V_{CS}$.

In the embodiment shown on FIG. 3a and FIG. 3b, both the main voltage converter system and the cold-start voltage converter receive input power through the same input terminal 11. In other embodiments, as shown for example on FIG. 4, the main voltage converter system and the cold-start voltage converter receive input power through different input terminals indicated by references 11 and 8.

As discussed above, the controller 40 is operable if a supply voltage $V_{sup}$ at a supply input of the controller is equal or above a minimum required supply voltage $V_{CS}$.

In embodiments, as schematically illustrated on FIG. 3a and FIG. 4, the main voltage converter system is configured for outputting power through a plurality of power transfer paths and wherein the plurality of power transfer paths comprises at least a first power transfer path P-O1 and a second power transfer path P-O2 configured for electrically connecting an output of the main voltage converter system with respectively the first storage device terminal 12 and the auxiliary terminal 9.

In some embodiments wherein the main voltage converter system only comprises a single voltage converter, as illustrated for example on FIG. 6 to FIG. 9, the main voltage converter system 20 comprises an output selection circuit 21 controlled by the controller and configured for selecting an power transfer path from the plurality of power transfer paths so as to output power via the power transfer path selected. In other words, the main voltage converter system 20 can selectively outputting power to either the first storage device terminal or to the auxiliary terminal.

In embodiments as shown on FIG. 3b, power can be transferred from the main voltage converter system to an integrated on-chip capacitor $C_{int}$ through the second power transfer path P-O2.

In embodiments wherein the main voltage converter system 20 comprises an output selection circuit 21, one or more switches S1, S2 as schematically illustrated on FIG. 3a, FIG. 3b and FIG. 4 are provided for selecting the power output path. If switch S1 is open and switch S2 is closed, power can be transferred from the main voltage converter system to the first storage device terminal 12 and if switch S1 is closed and switch S2 is open, power can be transferred from the main voltage converter system to the auxiliary terminal 9.

If a specific power transfer path is selected through the output selection circuit 21, it implies by definition that the other remaining power transfer paths are de-selected as only one power transfer path can be selected at a time.

In embodiments, as for example schematically illustrated on FIG. 3c, the main voltage converter system 20 is used for transferring power via the first power transfer path P-O1 to the first storage device terminal 12 while the cold-start voltage converter 30 is used for transferring power to the auxiliary terminal (9) or to the integrated on-chip capacitor $C_{int}$, so as to maintain the auxiliary voltage $V_{aux}$ equal to or above the lower threshold voltage $V_{sup-min}$. Hence, in these embodiments, the cold-start voltage converter is not only used for initially charging the internal node $N_{aux}$ until the auxiliary voltage $V_{aux}$ has increased from a value below the minimum required supply voltage $V_{CS}$ to a predefined switching voltage $V_{SW}$, as discussed above, but also to recharge the internal node $N_{aux}$ so as to maintain $V_{aux}$ equal to or above the lower threshold voltage $V_{sup-min}$.

In other embodiments according to the invention, as illustrated on FIG. 13 to FIG. 15, the main voltage converter system comprises two voltage converters: a first voltage converter 20a having an output coupled to the first power transfer path P-O1 and a second voltage converter 20b having an output coupled to the second power transfer path P-O2. Hence, in these embodiments having two output paths and two associated voltage converters, an output path selection circuit is not mandatory. However, in a PMIC embodiment, having for example a third power transfer path P-O3, as illustrated on FIG. 12, an output path selection circuit can select the first voltage converter 20a to either output power via the first P-O1 or via the third P-O3 output path.

The PMIC comprises, as further schematically illustrated on FIG. 3a to FIG. 4, an internal node $N_{aux}$. The internal node $N_{aux}$ electrically connects with the auxiliary terminal 9 or with the integrated on-chip capacitor $C_{int}$ such that an auxiliary voltage $V_{aux}$ of the internal node corresponds to a voltage at the auxiliary terminal 9 or corresponds to a voltage of the integrated on-chip capacitor $C_{int}$. The internal node $N_{aux}$ is further electrically connected with the supply input of the controller such that the supply voltage at the input of the controller corresponds to the auxiliary voltage $V_{aux}$. As illustrated on FIG. 3a to FIG. 15, the internal node $N_{aux}$ is a voltage node that is electrically separated from the first storage device terminal 12 such that the auxiliary voltage $V_{aux}$ is independent from a voltage at the first storage device terminal 12.

As mentioned above and illustrated on FIG. 3a and FIG. 3b, the second power transfer path P-O2 is connecting the output of the main voltage converter system with the auxiliary terminal. For the embodiment shown on FIG. 3b, the auxiliary voltage of the internal node $N_{aux}$ corresponds to the voltage of the integrated on-chip capacitor $C_{int}$.

A monitoring unit 45 coupled with the controller 40 is configured for monitoring the voltage $V_{aux}$ of the internal node and for monitoring a first storage parameter $V_{Batt1}$ at the first storage device terminal 12. In some embodiments, the first storage parameter $V_{Batt1}$ is a voltage sensed at the first storage device terminal 12, while in other embodiments the first storage parameter $V_{Batt1}$ can be an accumulated charge.

The controller is configured for both transferring power to the first storage device terminal 12 as long as the first storage parameter $V_{Batt1}$ is below a predefined upper storage value $V_{BATT1-up}$, and for transferring power to the auxiliary terminal 9 or to the integrated on-chip capacitor $C_{int}$ for maintaining the auxiliary voltage $V_{aux}$ either equal to a target value, or alternatively for maintaining the auxiliary voltage $V_{aux}$ within a voltage range between a lower threshold voltage $V_{sup-min}$ and an upper threshold voltage $V_{sup-max}$. The target value, or alternatively the lower threshold voltage $V_{sup-min}$, is defined to be higher than the minimum required supply voltage $V_{CS}$. The target value is for example a voltage suitable for operating the controller.

In embodiments, the controller is further configured enable operation of the cold-start voltage converter for recharging the auxiliary rechargeable energy storage device C1. In these embodiments, if the auxiliary voltage $V_C$ has decreased from the lower threshold voltage $V_{sup-min}$ to a value below the minimum required supply voltage $V_{CS}$ then the controller enables operation of the cold-start voltage converter for recharging the auxiliary rechargeable energy storage device C1 until a predefined switching voltage $V_{SW}$ is reached. Thereafter, operation of the cold-start voltage converter is disabled and operation of the main voltage converter system is enabled.

In embodiments wherein the controller is maintaining $V_{aux}$ equal to the target value, the predefined switching voltage $V_{SW}$ is equal or higher than the target value.

In embodiments wherein the controller is maintaining $V_{aux}$ within the voltage range between the lower $V_{sup-min}$ and the upper $V_{sup-max}$ threshold voltage, the predefined switching voltage $V_{SW}$ is equal or higher than the lower threshold voltage $V_{sup-min}$.

For embodiments wherein the main voltage converter system comprises two dedicated voltage converters, as illustrated for example on FIG. 13 to FIG. 15, the transfer of power to the first storage device terminal can be performed in parallel and independently of the transfer of power to the auxiliary terminal. In other embodiments, as illustrated for example on FIG. 6 wherein an output of a voltage converter is switched using an output selection circuit 21, the transfer of charges to the first storage device terminal and the auxiliary terminal cannot be performed simultaneously.

The controller 40 is further configured for disabling operation of the cold-start voltage converter 30 and enabling operation of the main voltage converter system if the auxiliary voltage $V_{aux}$ has increased from a value below the minimum required supply voltage $V_{CS}$ to a predefined switching voltage $V_{SW}$ equal to or higher than the voltage $V_{CS}$. This is, as discussed above, schematically illustrated on FIG. 2 where a switch from a cold-start voltage converter operational time period CS-VC to an main voltage converter system time period M-VC is illustrated.

The controller 40 is further configured for controlling the transfer of power via the first P-O1 and second P-O2 power output paths based on the monitoring of $V_{aux}$ and $V_{BATT1}$ and the comparison of actual values with predefined threshold values, more specifically, the main voltage converter system 20 is configured to perform steps of:

a) if $V_{sup-min} \leq V_{aux}$ and if $V_{BATT1} < V_{BATT1-up}$, with $V_{BATT1-up}$ being the predefined upper storage value for $V_{BATT1}$ and $V_{sup-min}$ being the predefined lower threshold voltage for $V_{aux}$, then selecting the first path P-O1 and operating the main voltage converter system for transferring power from the first power input terminal 11 to the first storage device terminal 12 and wherein the transferring of power to the first storage device terminal 12 is stopped if $V_{BATT1}$ has reached the predefined upper storage value $V_{BATT1-up}$; and b) if $V_{aux}$ has dropped from a value higher than the lower threshold $V_{sup-min}$ to a value lower than the lower threshold voltage $V_{sup-min}$ then selecting the second power transfer path P-O2 and operating the main voltage converter system until the auxiliary voltage $V_{aux}$ has increased to an upper threshold voltage $V_{sup-max}$. With $V_{sup-max}>V_{sup-min}$. In alternative embodiments, as discussed above, the controller is configured for operating the main voltage converter so as to continuously maintaining the auxiliary voltage $V_C$ equal to a target value.

By monitoring the voltage $V_{aux}$ and controlling the main voltage converter system as discussed above, the supply voltage $V_{sup}$ for the controller 40 is either maintained at the value $V_{sup-min}$ or maintained within the threshold voltages $V_{sup-min}$ and $V_{sup-max}$. The voltage at the first output terminal is also kept separated from the supply voltage $V_{sup}$. For example, if $V_{Batt1}$ is a voltage, the upper storage value $V_{BATT1-up}$ can be equal to 4.5 V and the upper threshold voltage $V_{sup-max}$ can be equal to for example 2.5 V or to any other suitable value.

The use of the term "controller" has to be construed in the broadest sense as being an electronic digital circuit generally comprising combinatory logic. The controller controlling the main voltage converter system is configured for controlling for example the power switches of the main voltage converter system.

In particular embodiments, instead of using an external auxiliary capacitor that can be coupled to an auxiliary output terminal 12, the PMIC comprises an integrated on-chip capacitor. In this particular embodiment, the second power transfer path P-O2 is configured for electrically connecting an output of the main voltage converter system with the integrated on-chip capacitor. In this embodiment the internal node $N_{aux}$ is also electrically connecting at least i) the integrated on-chip capacitor, ii) the supply input of the controller, iii) an output of the cold-start voltage converter.

In embodiments, the monitoring unit 45 comprises a signal comparator for comparing the parameters $V_{Batt1}$ and $V_{aux}$ with predefined threshold values. The signal comparator can either be an analogue signal comparator or a digital signal comparator, known in the art. For embodiments wherein a digital signal comparator is used, the generally analogue signals $V_{Batt1}$ and $V_{aux}$ are first digitized using an ADC (analog to digital converter). The predefined threshold values can be values locally memorized by the controller, or the predefined threshold values can be generated by a reference voltage generator, or a voltage configurator external to the PMIC can be used and threshold values can be transmitted through a configuration terminal or connector.

The cold-start voltage converter 30 is configured for starting operation if a minimum input voltage is available at an input of the cold-start voltage converter and if $V_{sup}<V_{CS}$, i.e. when the main voltage converter system is not operable, i.e. in a so-called reset mode.

In embodiments, the cold-start voltage converter comprises a charge pump and an oscillator providing a clock signal for the charge pump. The output of the charge pump supplies then the voltage $V_{aux}$, that is, as mentioned above, equal to the supply voltage $V_{sup}$ for the main voltage converter system. The oscillator is turned on by an enabling signal that is generated when the input voltage of the cold-start voltage converter is above a minimum input voltage. This minimum voltage is for example a reference voltage generated by a reference voltage generator. The oscillator is turned off, and hence the cold-start voltage converter is turned off, when the supply voltage $V_{sup}$ has reached the switching voltage $V_{SW}$, whereafter the main voltage converter system is turned on.

In FIG. 5 an example of an energy harvesting system is schematically shown comprising a PMIC 1, an energy harvester 70 coupled to the first power input terminal 11, a first rechargeable energy storage device BATT1 coupled to the first storage device terminal 12 and an auxiliary rechargeable storage device C1 coupled to the auxiliary terminal 9. In this example, an application load 90 is connected to the first rechargeable energy storage device BATT1.

As further illustrated on FIG. 5, the main voltage converter system 20 can make use of an inductor 25 which is generally located outside the PMIC 1 and which can be coupled to the PMIC with for example two dedicated terminals 14, 15 or by any other suitable coupling means.

In a preferred embodiment, the main voltage converter system 20 comprises a DC-DC buck/boost voltage converter, as illustrated on FIG. 6 and FIG. 7, that is capable of operating in either a boost mode, a buck mode or a buck boost mode depending on the input and output voltage of the main voltage converter system. When the main voltage converter system input voltage is smaller than the voltage converter output voltage, the buck/boost voltage converter will operate in a boost mode. On the other hand, the buck/boost voltage converter will operate in a buck mode if the input voltage is higher than the output voltage. If input and output voltage are about the same, the converter operates in a buck/boost mode. The output voltage of the main voltage converter system that is taken into account for determining the operation mode of the buck/boost voltage converter will depend on the power transfer path selected. For example, when the first power transfer path P-O1 or the second power transfer path P-O2 are selected, the output voltage taken into account corresponds to respectively the voltage at the first output terminal 12 and the voltage at the auxiliary terminal 9. Similarly, for embodiments wherein the main voltage converter system has multiple input paths each being connected to a corresponding power input terminal, the input voltage that is taken into account for defining the operational mode of the buck/boost converter corresponds to the voltage of the input terminal of the input path selected.

The main voltage converter system comprises 20 a plurality of power switches, for example the embodiment illustrated on FIG. 6 comprises an output selection circuit 21 having switches S1 and S2 and the buck/boost voltage converter 20a comprises switches S3A, S3B, S4A and S4B. The embodiment of a main voltage converter system shown on FIG. 7 is an embodiment comprising less switches than the embodiment shown in FIG. 6. Indeed, in the embodiment of FIG. 7, some switches of the buck/boost voltage converter 20a are also functioning as a selection switch for the output selection circuit. The function of switch S3B used during the nominal operation of the buck/boost voltage converter of FIG. 6 is performed in FIG. 7 by switch S2 that at the same time performs the function of selecting the first power transfer path PO-1, when switch S1 is remaining open. Similar if switch S2 remains open when selecting the second power transfer path PO-2, the switch S1 is used during nominal operation of the buck/boost voltage converter instead of switch S3B shown on FIG. 6. In other words, switches for the output selection circuit can be shared with switches for the nominal operation of the buck/boost voltage converter. The voltage converter system 20 embodiment shown on FIG. 9 comprises an output selection circuit 21 having switches S1 and S2, an input selection circuit 22 having switches S5 and S6 and a buck/boost voltage converter having switches 53A, S3B, 54A and S4B. In the embodiment of FIG. 8, the number of switches are reduced compared to the embodiment of FIG. 9, as the both the output selection circuit and the input selection circuit are sharing switches with the buck/boost voltage converter. The switches have to be construed as electronic switches configured for opening or closing an electrical conducting path or conductor. These switches are for example analogue electronic switches known in the art. These switches make use of for example MOS transistors.

To operate the buck/boost voltage converter embodiment shown on for example FIG. 7 in a boost mode for charging the first storage device with energy from the energy harvester the switch S1 remains open, the switch S4B is maintained closed and the switch S4A remains open during the charging of the first energy storage device BATT1. The boost mode starts with a magnetic energy charging phase of the inductor 25 wherein the switch S3A is closed and the switch S2 is open, followed by a magnetic energy de-charging phase wherein the switch S3A is opened and the switch S2 is closed. As known in the art, by repetitively controlling the switches S3A and S2, power is transferred in a boost mode from the energy harvester to the first rechargeable energy storage device BATT1.

To operate the buck/boost voltage converter shown on FIG. 7 in a buck mode for charging the first energy storage device, the switch S2 is maintained closed and the switch S3A and switch S1 remains open during the charging of the first energy storage device BATT1. The buck mode starts with a magnetic energy charging phase of the inductor 25 wherein the switch S4A is open and the switch S4B is closed, followed by a magnetic energy de-charging phase wherein the switch S4A is closed and the switch S4B is opened. As known in the art, by repetitively controlling the switches S4A and S4B, power is transferred in a buck mode from the energy harvester to the first rechargeable energy storage device BATT1.

As mentioned above and illustrated with the example shown on FIG. 7, the switch S2 is not only used as a standard switch needed for operating the DC/DC buck/boost voltage converter but the switch S2 is also forming part of the output selection circuit 21. Indeed by opening switch S2 and closing switch S1 the second power transfer path P-O2 is selected. In this way, the number of electronic switches for performing both the nominal operational function of the voltage converter and the power transfer path selection function, is limited. However, using dedicated switches for the input and/or output selection circuit as shown on for example FIG. 9 and FIG. 6 has also an advantage, namely the fact that there are less parasitic capacitances on the node switched from the inductor 25, and hence less power losses.

In preferred embodiments, as illustrated in FIG. 10, the power management integrated circuit comprises a second storage device terminal 13 connectable with a second rechargeable energy storage device BATT2, and the plurality of power transfer paths comprises a third power transfer path P-O3 configured for electrically connecting the output of the main voltage converter system 20 with the second storage device terminal 13. The third power transfer path can be selected with the switch S7 shown on FIG. 10.

Generally the second rechargeable energy storage device BATT2 has second storage parameter $V_{BATT2}$, as schematically shown on FIG. 11, indicative of a charging level of the second rechargeable energy storage device BATT2.

Preferably, the controller 40 is configured for selecting the third path P-O3 and operating the main voltage converter system 20 for transferring power from the first power input terminal 11 to the second storage device terminal 13 if the first storage parameter $V_{BATT1}$ has reached the predefined upper storage value $V_{BATT1-up}$. Advantageously, by charging a second rechargeable energy storage device BATT2 connected to the second storage device terminal 13 when the first rechargeable energy storage device has reached the charging level defined by the upper storage value $V_{BATT1-up}$, additional energy can be stored and used later when for example the energy harvester is not supplying any power. The second energy storage device can have for example a large energy storage capacity and hence be used as a large energy reservoir.

In embodiments, as shown for example on FIG. 8, FIG. 9 and FIG. 11, the main voltage converter system 20 comprises an input selection circuit 22 controlled by the controller 40 and configured for selecting an input path from a plurality of input paths so as to receive an input power via the input path selected. In this way, the main voltage converter system can receive an input power from various energy sources.

In embodiments of energy harvesting systems, as shown on FIG. 8 and FIG. 11, the plurality of input paths for supplying power to the main voltage converter system comprises at least a first input path P-I1 and a second input path P-I2 configured for electrically connecting respectively the first power input terminal 11 and a further power input terminal 18 with an input of the main voltage converter system 20. The first BATT1 or the second BATT2 rechargeable energy storage device can for example be electrically connected with this further power input terminal 18 by a connection external to the PMIC and the second input path P-I2 can be selected by the input selection circuit 22 by closing switch S6 and opening switch S5. This allows, when the energy harvester 70 is no longer supplying any power, to transfer energy from the second rechargeable energy storage device BATT2 to the first rechargeable energy storage device BATT1. In this way, the application load 90 can still continue to operate even under conditions where the energy harvester is not supplying any power.

In embodiments, as shown on FIG. 8, the PMIC comprises a further power input terminal 18 and a second input path P-I2 that electrically connects this further input terminal 18 with the input of the main voltage converter system 20. In this way, when the auxiliary voltage $V_{aux}$ has dropped below the lower threshold voltage $V_{sup-min}$ and the energy harvester is not supplying energy or not supplying sufficient energy, by selecting the second input path P-I2, the main voltage converter system 20 can transfer charges from the further power input terminal 18 to the auxiliary output terminal 9. In embodiments, an additional energy harvester or power source can be connected to the further power terminal 18. In other embodiments, the first output terminal 12 can be electrically connected with the further input terminal 18 in order to be able to transfer charges from the first output terminal, where for example a first rechargeable storage device BATT1 is connected, to the further input terminal 18.

In the embodiment shown on FIG. 9, the second input path PI-2 is an internal path of the PMIC 1 connecting the first output terminal 12 with the input of the main voltage converter system 20. As mentioned above, when the auxiliary voltage $V_{aux}$ has dropped below the lower threshold voltage $V_{sup-min}$ and the energy harvester is not supplying energy or not supplying sufficient energy, by selecting the second input path P-I2, the main voltage converter system 20 can transfer charges from the first output terminal 12 to the auxiliary output terminal 9.

In embodiments comprising the above mentioned further power input terminal 18, the controller 40 is further configured for selecting the second input path P-I2, selecting the second power transfer path P-O2, and operating the main voltage converter system 20 until the auxiliary voltage $V_{aux}$ has increased to the upper threshold $V_{sup-max}$. In embodiments, this selection of the second input path and second output path occurs if $V_{aux}$ has dropped from a value higher than the lower threshold voltage $V_{sup-min}$ to a predefined critical threshold voltage $V_{T-B}$, with $V_{CS} < V_{T-B} < V_{sup-min}$. The predefined critical threshold voltage $V_{T-B}$ is schematically illustrated on FIG. 2. In alternative embodiments, the selection of the second input path and the second output path occurs if the auxiliary voltage $V_C$ has dropped below the lower threshold voltage $V_{sup-min}$ and if at the same time the monitoring unit detects that no input power is available at the first input terminal.

In the embodiment shown on FIG. 11, the energy harvesting system also comprises a primary battery 80 connected to an additional input terminal 16 of the PMIC 1. A switch SW allows to select between the energy harvester 70 and the primary battery 80. The primary battery 80 is a backup energy source that can be used when the energy harvester 70 is not operating and the storage device gets depleted.

Generally, as illustrated on FIG. 11, the input of the main voltage converter system 20 is also connected with another input terminal 17 that is coupled to an external capacitor C2. This external capacitor C2 allows to stabilize the input voltage of the main voltage converter system.

As discussed above, the cold-start voltage converter 30 either receives input power from the energy harvester 70 or it receives input power from another energy source, such as for example a primary battery, another storage device or an auxiliary supply such as an USB connection. This is illustrated on FIG. 11 where an auxiliary energy source 75 is coupled to a dedicated input terminal 8 of the PMIC for supplying input power to the cold-start voltage converter. Advantageously, such an auxiliary supply also allows the PMIC to be tested without having to wait energy harvesting to occur.

In the embodiments shown for example on FIG. 6 and FIG. 7, the main voltage converter system 20 comprises a single voltage converter 20a which is used for both transferring power to either the first output terminal 12 or to the auxiliary output terminal 9. However, the main voltage converter system 20 of the PMIC according to the invention is not limited to one voltage converter or to a specific number of voltage converters. For example, as discussed above, in FIG. 12 to FIG. 15, embodiments are shown of a main voltage converter system 20 comprising a first voltage converter 20a and a second voltage converter 20b. In these examples, the first voltage converter is configured for transferring power to the first output terminal 12 or to the second output terminal 13 and the second voltage converter is configured for transferring power to the auxiliary output terminal 9. The first and second voltage converter can either make use of the same common inductor 25 or the first and second voltage converter can make use of respectively a first and a second inductor. Advantageously when using a first and a second voltage converter, the two voltage converters can be used simultaneously.

In embodiments of energy harvesting systems wherein capacitors and/or a supercapacitors are used, the first rechargeable energy storage device BATT1 has an energy storage capacity between 1 microfarad and 100 farad, and the auxiliary rechargeable energy storage device C1 has an energy storage capacity between 0.1 nanofarad and 100 microfarad.

The invention claimed is:

1. A method for energy harvesting using a power management integrated circuit comprising a cold-start voltage converter, a main voltage converter system (20) and a controller (40) for controlling the main voltage converter system, and wherein the controller is operable if a supply voltage ($V_{sup}$) at a supply input of the controller is equal or above a minimum required supply voltage ($V_{CS}$), said method comprising:

coupling an energy harvester (70) to an input of the main voltage converter system, coupling a first rechargeable energy storage device (BATT1) to an output of the main voltage converter system, coupling the energy harvester (70) or another energy source to an input of the cold-start voltage converter, coupling an auxiliary rechargeable energy storage device (C1), preferably a capacitor, to an output of the cold-start voltage converter, coupling the auxiliary rechargeable energy storage device (C1) to the supply input of the controller for using said auxiliary rechargeable energy storage device (C1), when charged, as a voltage source for said controller, monitoring an auxiliary voltage ($V_C$) of said auxiliary rechargeable energy storage device (C1) and monitoring a first storage parameter ($V_{Batt1}$) indicative of a charging level of said first rechargeable energy storage device (BATT1), charging said auxiliary rechargeable energy storage device (C1) by operating said cold-start voltage converter until the auxiliary voltage ($V_C$) has reached a predefined switching voltage ($V_{sw}$) equal to or higher than said minimum required supply voltage ($V_{CS}$), enabling operation of the main voltage converter system and disabling operation of the cold-start voltage converter if the auxiliary voltage ($V_C$) has reached said predefined switching voltage ($V_{SW}$), operating the main voltage converter system (20) for charging said first rechargeable energy storage device (BATT1) with energy from the energy harvester (70) as long as said first storage parameter ($V_{Batt1}$) of said first rechargeable energy storage device (BATT1) is below a predefined upper storage value ($V_{Batt1-up}$), wherein said upper storage value ($V_{Batt1-up}$) when reached corresponds to the first rechargeable energy storage device being charged such that the charged rechargeable energy storage device can be used to provide power to an application load, and during the charging of the first rechargeable energy storage device (BATT1) to said upper storage value ($V_{Batt1-up}$), maintaining said auxiliary rechargeable energy storage energy device (C1) electrically separated from the first rechargeable energy storage device (BATT1), such that the auxiliary voltage ($V_C$) at the auxiliary rechargeable energy storage device (C1) remains independent from a voltage at the first rechargeable energy storage device (BATT1), during said charging of the first rechargeable energy storage device (BATT1) to said upper storage value ($V_{Batt1-up}$), maintaining said auxiliary voltage ($V_C$) of said auxiliary rechargeable energy storage device (C1):

a) equal to a target value, and wherein said target value is a predefined voltage value corresponding to a suitable voltage value for operating the controller (40), or alternatively, b) within a voltage range between a lower threshold voltage ($V_{sup-min}$) and an upper threshold voltage ($V_{sup-max}$) higher than the lower threshold voltage ($V_{sup-min}$), wherein said voltage range corresponds to a range of voltages that are optimum as a supply voltage for operating the controller, and wherein said target value and said lower threshold voltage ($V_{sup-min}$) are equal or lower than said predefined switching voltage ($V_{SW}$) and higher than said minimum required supply voltage ($V_{CS}$), and wherein said maintaining of the auxiliary voltage equal to the target value or within the voltage range comprises: operating the main voltage converter system, or alternatively operating the cold-start voltage converter, for recharging the auxiliary rechargeable energy storage device (C1) with energy from the energy harvester (70).

2. The method according to claim 1
wherein said maintaining the auxiliary voltage ($V_C$) equal to a target value comprises:
continuously compensating a decrease of charges of said auxiliary rechargeable energy storage device (C1) such that the auxiliary voltage ($V_C$) remains equal to the target value
and wherein said maintaining the auxiliary voltage ($V_C$) within a lower threshold voltage ($V_{sup-min}$) and an upper threshold value ($V_{sup-max}$) comprises:
if the auxiliary voltage ($V_C$) has dropped below said lower threshold voltage ($V_{sup-min}$) then recharging the auxiliary rechargeable energy storage device (C1) until the auxiliary voltage ($V_C$) has reached said upper threshold voltage ($V_{sup-max}$).

3. The method according to claim 1 wherein the main voltage converter system is operated for recharging the auxiliary rechargeable energy storage device (C1) with energy from the energy harvester (70) if the auxiliary voltage ($V_C$) drops below the lower threshold voltage ($V_{sup-min}$), and wherein the recharging comprising:
i) decoupling the output of the main voltage converter system from the first rechargeable energy storage device (BATT1),
ii) coupling the output of the main voltage converter system to the auxiliary rechargeable energy storage device (C1) and operating the main voltage converter system for recharging the auxiliary rechargeable energy storage device (C1) until the auxiliary voltage ($V_C$) has reached the upper threshold voltage ($V_{sup-max}$),
iii) if the auxiliary voltage ($V_C$) has reached the upper threshold voltage ($V_{sup-max}$) then decoupling the output of the main voltage converter system from the auxiliary rechargeable energy storage device (C1) and coupling the output of the main voltage converter system to the first rechargeable energy storage device (BATT1).

4. The method according to claim 3 wherein the auxiliary rechargeable energy storage device (C1) is recharged with energy from the first rechargeable energy storage device (BATT1) if
a) the first storage parameter ($V_{Batt1}$) is higher than a predefined lower storage value ($V_{Batt1-min}$), and
b) the auxiliary voltage ($V_C$) drops below the lower threshold voltage ($V_{sup-min}$) and the energy harvester is not providing energy, or the auxiliary voltage ($V_C$) drops from a value above the lower threshold voltage ($V_{sup-min}$) to below a predefined critical threshold voltage ($V_{T-B}$), with $V_{CS}<V_{T-B}<V_{sup-min}$, wherein $V_{CS}$, $V_{T-B}$ and $V_{sup-min}$ are respectively the minimum required supply voltage, the critical threshold voltage and the lower threshold voltage, and wherein the recharging comprising:
iv) decoupling the energy harvester (70) from the input of the main voltage converter system,
v) decoupling the first rechargeable energy storage device (BATT1) from the output of the main voltage converter system,
vi) coupling the first rechargeable energy storage device (BATT1) to the input of the main voltage converter system,
vii) coupling the output of the main voltage converter system to the auxiliary rechargeable energy storage device (C1) and operating the main voltage converter system for recharging the auxiliary rechargeable energy storage device (C1) until the auxiliary voltage $V_C$ has reached the upper threshold voltage ($V_{sup-max}$),
viii) if the auxiliary voltage ($V_C$) has reached the upper threshold voltage ($V_{sup-max}$) then recoupling the energy harvester to the input of the main voltage converter system and recoupling the first rechargeable energy storage device (BATT1) to the output of the main voltage converter system.

5. The method according to claim 1 wherein the auxiliary rechargeable energy storage device (C1) is recharged with energy from the first rechargeable energy storage device (BATT1) if
a) the first storage parameter ($V_{Batt1}$) is higher than a predefined lower storage value ($V_{Batt1-min}$), and
b) the auxiliary voltage ($V_C$) drops below the lower threshold voltage ($V_{sup-min}$) and the energy harvester is not providing energy, or the auxiliary voltage ($V_C$) drops from a value above the lower threshold voltage ($V_{sup-min}$) to below a predefined critical threshold voltage ($V_{T-B}$), with $V_{CS}<V_{T-B}<V_{sup-min}$, wherein $V_{CS}$, $V_{T-B}$ and $V_{sup-min}$ are respectively the minimum required supply voltage, the critical threshold voltage and the lower threshold voltage,
and wherein the recharging comprising:
i) decoupling the energy harvester (70) from the input of the main voltage converter system,
ii) decoupling the first rechargeable energy storage device (BATT1) from the output of the main voltage converter system,
iii) coupling the first rechargeable energy storage device (BATT1) to the input of the main voltage converter system,
iv) coupling the output of the main voltage converter system to the auxiliary rechargeable energy storage device (C1) and operating the main voltage converter system for recharging the auxiliary rechargeable energy storage device (C1) until the auxiliary voltage ($V_C$) has reached the upper threshold voltage ($V_{sup-max}$),
v) if the auxiliary voltage ($V_C$) has reached the upper threshold voltage ($V_{sup-max}$) then recoupling the energy harvester to the input of the main voltage converter system and recoupling the first rechargeable energy storage device (BATT1) to the output of the main voltage converter system.

6. The method according to claim 1 further comprising
if the auxiliary voltage ($V_C$) has decreased from the lower threshold voltage ($V_{sup-min}$) to a value below the minimum required supply voltage ($V_{CS}$) then enabling operation of the cold-start voltage converter for recharging the auxiliary rechargeable energy storage device (C1) until said predefined switching voltage Vsw is reached, and whereafter operation of the cold-start voltage converter is disabled and operation of the main voltage converter system is enabled.

7. The method according to claim 1 wherein said main voltage converter system (20) comprises a first voltage converter (20a) and a second voltage converter (20b), and wherein said charging of the first rechargeable energy storage device (BATT1) with energy from the energy harvester (70) is performed by operating said first voltage converter (20a) and said recharging of the auxiliary rechargeable energy storage device (C1) with energy from the energy harvester (70) or with energy from the first rechargeable energy storage device (BATT1) is performed by operating said second voltage converter (20b), and wherein said recharging of the auxiliary rechargeable energy storage device (C1) is performed independently from said charging of the first rechargeable energy storage device (BATT1).

8. The method according to claim 1 wherein said main voltage converter system (20) comprises a buck/boost voltage converter configured for operating in a buck mode if $V_{in} > (V_{out+\Delta})$, for operating in a boost mode if $V_{in} < (V_{out-\Delta})$, and for operating in a buck-boost mode if $V_{in} = V_{out \pm \Delta}$, with $V_{in}$ and $V_{out}$ being respectively the input and output voltage of the main voltage converter system and $\Delta$ being an operational parameter of the buck/boost voltage converter.

9. The method according to claim 1 wherein said first rechargeable energy storage device (BATT1) has an energy storage capacity that is more than hundred times, preferably more than thousands times, larger than the energy storage capacity of the auxiliary rechargeable energy storage device (C1).

10. The method according to claim 1 further comprising:
if after charging the first rechargeable storage device (BATT1), the first storage parameter ($V_{Batt1}$) of the first rechargeable energy storage device (BATT1) is dropping below said upper storage value ($V_{Batt1-up}$) then operating the main voltage converter system (20) for recharging the first rechargeable energy storage device (BATT1) with energy from the energy harvester (70) so as to maintain the first rechargeable energy storage device (BATT1) charged, and during said recharging of the first rechargeable energy storage device (BATT1), maintaining said auxiliary rechargeable energy storage energy device (C1) electrically separated from the first rechargeable energy storage device (BATT1).

11. A power management integrated circuit (1) for energy harvesting comprising:
one or more power input terminals for receiving input power from an energy harvester or another power source,
a first storage device terminal (12) connectable with a first rechargeable energy storage device,
an integrated on-chip capacitor ($C_{int}$) or an auxiliary terminal (9) connectable with an auxiliary rechargeable energy storage device,
a main voltage converter system (20) configured for receiving input power through a first power input terminal (11) of said one or more power input terminals,
a controller (40) configured for controlling said main voltage converter system (20), and wherein the controller is operable if a supply voltage ($V_{sup}$) at a supply input of the controller (40) is equal or above a minimum required supply voltage ($V_{CS}$),
a cold-start voltage converter (30) configured for i) transferring input power to said auxiliary terminal (9) or to the integrated on-chip capacitor ($C_{int}$), ii) receiving the input power through said first power input terminal (11) or through a second power input terminal (8) of said one or more power input terminals, and iii) starting operation if a minimum input voltage is available at an input of the cold-start voltage converter and if the supply voltage for the controller ($V_{sup}$) is lower than the minimum required supply voltage ($V_{CS}$), wherein said power management integrated circuit comprises
an internal node ($N_{aux}$) electrically connected with said auxiliary terminal (9) or said integrated on-chip capacitor ($C_{int}$) such that an auxiliary voltage ($V_{aux}$) of said internal node corresponds to a voltage at said auxiliary terminal (9) or corresponds to a voltage of the integrated on-chip capacitor ($C_{int}$), and wherein the internal node ($N_{aux}$) is further electrically connected with said supply input of the controller such that the supply voltage at the input of the controller corresponds to said auxiliary voltage ($V_{aux}$), and said internal node ($N_{aux}$) is electrically separated from said first storage device terminal (12) such that the auxiliary voltage ($V_{aux}$) is independent from a voltage at the first storage device terminal (12),
a monitoring unit (45) coupled with said controller (40) and configured for monitoring said auxiliary voltage ($V_{aux}$) of said internal node and for monitoring a first storage parameter ($V_{Batt1}$) at said first storage device terminal (12),
and wherein said controller (40) is configured for
i) operating the main voltage converter system (20) for transferring power via a first power transfer path (P-O1) to the first storage device terminal (12) as long as the first storage parameter ($V_{Batt1}$) is below a predefined upper storage value ($V_{BATT1-up}$), wherein said upper storage value ($V_{Batt1-up}$) when reached corresponds to the first rechargeable energy storage device being charged, and
ii) operating the main voltage converter system (20) for transferring power via a second power transfer path (P-O2) to said auxiliary terminal (9) or to said integrated on-chip capacitor ($C_{int}$) or alternatively enabling operating the cold-start voltage converter (30) for transferring power to said auxiliary terminal (9) or to said integrated on-chip capacitor ($C_{int}$), and maintaining said auxiliary voltage ($V_{aux}$) a) either equal to a target value, wherein said target value is a predefined voltage value corresponding to a suitable value for operating the controller (40), or b) within a voltage range between a lower threshold voltage ($V_{sup-min}$) and an upper threshold voltage ($V_{sup-max}$) higher than said lower threshold ($V_{sup-min}$), and with said target value and said lower threshold voltage ($V_{sup-min}$) being higher than said minimum required supply voltage ($V_{CS}$), and wherein said voltage range corresponds to a range of voltages that are optimum as a supply voltage for operating the controller.

12. The power management integrated circuit (1) according to claim 11
wherein said maintaining the auxiliary voltage ($V_{aux}$) equal to a target value comprises:
operating the main voltage converter system or the cold-start voltage converter (30) for continuously maintaining the auxiliary voltage ($V_C$) equal to the target value,
and wherein said maintaining the auxiliary voltage ($V_{aux}$) within a voltage range comprises:
if the auxiliary voltage ($V_{aux}$) has dropped below said lower threshold voltage ($V_{sup-min}$), operating the main voltage converter system (20) or the cold-start voltage converter (30) for transferring power to said auxiliary terminal (9) or to said integrated on-chip capacitor ($C_{int}$) until the auxiliary voltage ($V_{aux}$) has increased to an upper threshold voltage ($V_{sup-max}$) higher than said lower threshold ($V_{sup-min}$).

13. The power management integrated circuit according to claim 11 wherein said main voltage converter system (20) comprises
    a first voltage converter (20a) having an output coupled to said first storage device terminal (12) via said first power transfer path (P-O1) and an input connected with said first power input terminal (11), and
    a second voltage converter (20b) having an output coupled to said integrated on-chip capacitor ($C_{int}$) or said auxiliary terminal (9) via said second power transfer path (P-O2) and an input connected to either one of: said first power input terminal (11), said first storage device terminal (12), or an additional power input terminal.

14. The power management integrated circuit according to claim 11 wherein said main voltage converter system (20) comprises a buck/boost voltage converter configured for operating in a buck mode if $V_{in} > (V_{out+\Delta})$, for operating in a boost mode if $V_{in} < (V_{out-\Delta})$, and for operating in a buck-boost mode if $V_{in} = V_{out\pm\Delta}$, with $V_{in}$ and $V_{out}$ being respectively the input and output voltage of the main voltage converter system (20) and $\Delta$ being an operational parameter of the buck/boost voltage converter.

15. The power management integrated circuit (1) according to claim 11 wherein said main voltage converter system (20) comprises an input selection circuit (22) controlled by said controller (40) and configured for selecting an input path from a plurality of input paths such that the main voltage converter system (20) is receiving input power via the input path selected, and wherein said plurality of input paths for the main voltage converter system comprises at least i) a first input path (P-I1) electrically connecting said first power input terminal (11) with an input of the main voltage converter system (20), and ii) a second input path (P-I2) electrically connecting a further power input terminal (18) with the input of the main voltage converter system (20) or, alternatively, electrically connecting the first storage device terminal (12) with the input of the main voltage converter system.

16. The power management integrated circuit, according to claim 15 wherein the controller (40) is further configured for selecting the second input path (P-I2), and operating the main voltage converter system (20) for transferring power via the second power transfer path (P-O2) to the auxiliary terminal (9) or to the integrated on-chip capacitor ($C_{int}$), and wherein said selecting of the second input path (P-I2) is performed if any of the two following conditions occurs:
    a) if the auxiliary voltage ($V_{aux}$) has dropped from a value higher than said lower threshold voltage ($V_{sup-min}$) to a predefined critical threshold voltage ($V_{T-B}$), with $V_{CS} < V_{T-B} < V_{sup-min}$, wherein $V_{CS}$, $V_{T-B}$ and $V_{sup-min}$ are respectively the minimum required supply voltage, the critical threshold voltage and the lower threshold voltage, or
    b) if the auxiliary voltage ($V_C$) has dropped below the lower threshold voltage ($V_{sup-min}$) and the monitoring unit detects that no input power is available at the first input terminal.

17. The power management integrated circuit according to claim 11 wherein the controller is further configured for
    iii) if the auxiliary voltage ($V_C$) has decreased from the lower threshold voltage ($V_{sup-min}$) to a value below the minimum required supply voltage ($V_{CS}$) then enabling operation of the cold-start voltage converter for recharging the auxiliary rechargeable energy storage device (C1) until a predefined switching voltage $V_{SW}$ is reached, and whereafter operation of the cold-start voltage converter is disabled and operation of the main voltage converter system is enabled, preferably said predefined switching voltage ($V_{SW}$) is equal or higher than said target value or alternatively equal or higher than said lower threshold voltage ($V_{sup-min}$).

18. A system for energy harvesting (100) comprising
    an integrated circuit (1) according to claim 11, an energy harvester (70) coupled to said first power input terminal (11),
    a first rechargeable energy storage device (BATT1) coupled to said first storage device terminal (12), preferably said first rechargeable energy storage device (BATT1) is a rechargeable battery, a capacitor or supercapacitor, preferably said first rechargeable energy storage device (BATT1) is a supercapacitor having an energy storage capacity between 1 microfarad and 100 farad,
    an auxiliary rechargeable energy storage device (C1) coupled to said auxiliary terminal (9), preferably said auxiliary rechargeable energy storage device is a capacitor having an energy storage capacity between 0.1 nanofarad and 100 microfarad.

* * * * *